United States Patent
Nystad et al.

(10) Patent No.: US 9,116,790 B2
(45) Date of Patent: Aug. 25, 2015

(54) METHODS OF AND APPARATUS FOR STORING DATA IN MEMORY IN DATA PROCESSING SYSTEMS

(75) Inventors: Jorn Nystad, Trondheim (NO); Ola Hugosson, Lund (SE); Oskar Flordal, Lund (SE)

(73) Assignee: ARM LIMITED, Cambridge (GB)

( * ) Notice: Subject to any disclaimer, the term of this patent is extended or adjusted under 35 U.S.C. 154(b) by 346 days.

(21) Appl. No.: 13/566,887

(22) Filed: Aug. 3, 2012

(65) Prior Publication Data

US 2013/0198485 A1  Aug. 1, 2013

Related U.S. Application Data

(63) Continuation-in-part of application No. 13/198,449, filed on Aug. 4, 2011.

(51) Int. Cl.
G06F 12/02 (2006.01)

(52) U.S. Cl.
CPC ......... *G06F 12/0215* (2013.01); *Y02B 60/1225* (2013.01)

(58) Field of Classification Search
None
See application file for complete search history.

(56) References Cited

U.S. PATENT DOCUMENTS

| | | | |
|---|---|---|---|
| 6,130,680 A * | 10/2000 | Cox et al. | 345/544 |
| 8,346,823 B2 | 1/2013 | Gaeta | |
| 2005/0174355 A1 | 8/2005 | Sadowsky et al. | |
| 2009/0244074 A1* | 10/2009 | Montrym et al. | 345/522 |
| 2010/0328329 A1* | 12/2010 | Mallett | 345/531 |
| 2013/0036290 A1* | 2/2013 | Nystad et al. | 711/201 |

OTHER PUBLICATIONS

Office Action dated Jul. 5, 2013 in U.S. Appl. No. 13/198,449, 10 pages.
Response to Office Action dated Nov. 5, 2013 in U.S. Appl. No. 13/198,449, 9 pages.
Final Office Action dated Jan. 16, 2014 in U.S. Appl. No. 13/198,449, 10 pages.
Notice of Allowance dated Nov. 13, 2014 in U.S. Appl. No. 13/198,449, 9 pages.

* cited by examiner

*Primary Examiner* — Denise Tran
(74) *Attorney, Agent, or Firm* — Vierra Magen Marcus LLP

(57) ABSTRACT

A data array 20 to be stored is first divided into a plurality of blocks 21. Each block 21 is further sub-divided into a set of sub-blocks 22, and a set of data for each sub-block 22 is then stored in a body data buffer 30. A header data block 23 is stored for each block 21 at a predictable memory address within a header buffer 24. Each header data block contains pointer data indicating the position within the body buffer 30 where the data for the sub-blocks for the block 21 that that header data block 23 relates to is stored, and data indicating the size of the stored data for each respective sub-block 22.

16 Claims, 10 Drawing Sheets

| Start Offset | $S_0$ | $S_1$ | $S_2$ | $S_3$ | $S_4$ | $S_5$ | $S_6$ | $S_7$ | $S_8$ | $S_9$ | $S_{10}$ | $S_{11}$ | $S_{12}$ | $S_{13}$ | $S_{14}$ | $S_{15}$ | $S_{16}$ | $S_{17}$ | $S_{18}$ | $S_{19}$ | $S_{20}$ | $S_{21}$ | $S_{22}$ | $S_{23}$ |

Y Plane:

| 3 | 5 | 8 |
|---|---|---|
| 2 | 0 | 6 | 9 |
| 21 | 23 | 11 | 14 |
| 20 | 18 | 12 | 15 |
| | | 17 | |

UV Plane:

| 4 | 7 |
|---|---|
| 1 | 10 |
| 22 | 13 |
| 19 | 16 |

METHODS OF AND APPARATUS FOR STORING DATA IN MEMORY IN DATA PROCESSING SYSTEMS

CLAIM OF PRIORITY

This application is a continuation-in-part application of U.S. patent application Ser. No. 13/198,449, "METHODS OF AND APPARATUS FOR STORING DATA IN MEMORY IN DATA PROCESSING SYSTEMS," filed on Aug. 4, 2011, which is incorporated herein by reference in its entirety.

BACKGROUND

The technology described herein relates to a method of and apparatus for storing data in memory in data processing systems, and in particular to such a method and apparatus for use to store texture data and frame buffer data in computer graphics processing systems.

It is common in computer graphics systems to generate colours for sampling positions in the image to be displayed by applying so-called textures or texture data to the surfaces to be drawn. For example, surface detail on objects may be generated by applying a predefined "texture" to a set of polygons representing the object, to give the rendered image of the object the appearance of the "texture". Such textures are typically applied by storing an array of texture elements or "texels", each representing given texture data (such as colour, luminance, and/or light/shadow, etc. values), and then mapping the texels onto the corresponding elements, such as (and, indeed, typically) a set of sampling positions, for the image to be displayed. The stored arrays of texture elements (data) are typically referred to as "texture maps".

Such arrangements can provide high image quality, but have a number of drawbacks. In particular, the storage of the texture data and accessing it in use can place, e.g., high storage and bandwidth requirements on a graphics processing device (or conversely lead to a loss in performance where such requirements are not met). This is particularly significant for mobile and handheld devices that perform graphics processing, as such devices are inherently limited in their, e.g., storage, bandwidth and power resources and capabilities.

It is known therefore to try to store such texture data in a "compressed" form so as to try to reduce, e.g., the storage and bandwidth burden that may be imposed on a device.

A further consideration when storing texture data (whether compressed or not) for use in graphics processing is that typically the graphics processing system will need to be able to access the stored texture data in a random access fashion (as it will not be known in advance which part or parts of the texture map will be required at any particular time). This places a further constraint on the storage of the texture data, as it is accordingly desirable to be able to store the texture data in a manner that is suitable for (and efficient for) random access to the stored data. This problem can be exacerbated where the size of the stored texture data in memory can vary, e.g. because the compression rate applied to the texture data is variable.

One way to facilitate random access to texture data is to store the texture data in memory on a block-by-block basis, at fixed memory locations, with each block being allocated sufficient memory space to store the maximum size any block to be stored could require (after any compression). However, the Applicants have recognised that this could be relatively wasteful of memory space, e.g., if not all blocks were to require the maximum possible memory space.

The Applicants accordingly believe that there remains scope for, and a need for, more efficient arrangements for storing data, such as texture data for use in graphics processing, in memory.

BRIEF DESCRIPTION OF THE DRAWINGS

A number of embodiments of the technology described herein will now be described by way of example only and with reference to the accompanying drawings, in which:

FIG. 9 shows schematically the arrangement for a block of a data array of data in a header data block and a body buffer in memory for YUV 420 data in an embodiment of the technology described herein;

FIG. 10 shows schematically the order of the stored sub-block data in the embodiment of FIG. 9;

FIG. 12 shows schematically the arrangement for a block of a data array of data in a header data block and a body buffer in memory for YUV 422 data in an embodiment of the technology described herein;

FIG. 13 shows schematically the order of the stored sub-block data in the embodiment of FIG. 12.

DETAILED DESCRIPTION

Figure 1:
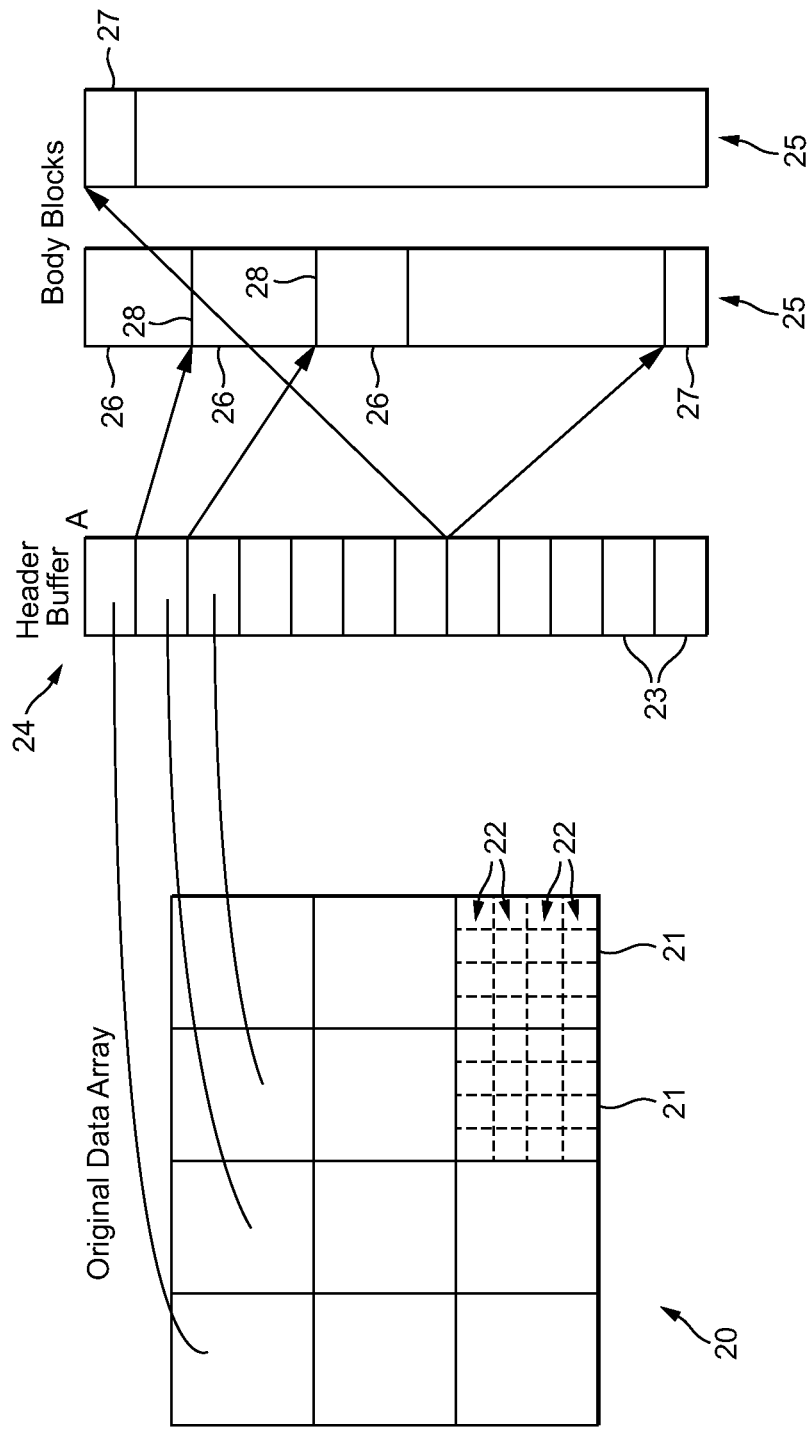
FIG. 1 shows schematically the storing of an array of data in accordance with an embodiment of the technology described herein.

A first embodiment of the technology described herein comprises a method of storing an array of data in memory, the method comprising:

dividing the array of data to be stored into a plurality of blocks;

dividing each respective block of the data array into a plurality of sub-blocks;

storing data representing each respective sub-block of the data array in memory; and storing, for each respective block that the data array has been divided into, a header data block at a predictable memory address, the header data block containing pointer data indicating the location in memory where the data for the sub-blocks for the block of the data array that the header data block relates to is stored.

A second embodiment of the technology described herein comprises an apparatus for storing an array of data in memory, the apparatus comprising:

processing circuitry configured to:

divide the array of data to be stored into a plurality of blocks;

divide each respective block of the data array into a plurality of sub-blocks;

store data representing each respective sub-block of the data array in memory; and store, for each respective block that the data array has been divided into, a header data block at a predictable memory address, the header data block containing pointer data indicating the location in memory where the data for the sub-blocks for the block of the data array that the header data block relates to is stored.

In some embodiments, the processing circuitry may be in communication with one or more memory devices that store the array of data and/or store the data described herein and/or store software for performing the processes described herein. The processing circuitry may also be in communication with a display for displaying images based on the data described above, or a graphics processor for processing the data described above.

A third embodiment of the technology described herein comprises a stored set of data (and/or data format) representing an array of data to be used in a data processing system, comprising:

a plurality of header data blocks, each header data block being stored at a predictable memory address and relating to a respective block of a plurality of blocks that the data array has been divided into; and a plurality of sets of sub-block data, each set of sub-block data relating to a sub-block that a block of the data array has been divided into; and wherein:

each block that the data array has been divided into is divided into plural sub-blocks; and each header data block contains pointer data indicating the location in memory where the sub-block data for the respective sub-blocks that the block of the data array that the header data block relates to has been divided into is stored.

In one example implementation, the stored set of data is stored on a computer-readable storage medium in the data format described above.

In the technology described herein, an array of data (which may be, as discussed above, an array of (e.g. compressed) texture data or an array of (e.g. compressed) frame buffer data) to be stored in memory is first divided into plural blocks, and then each block is sub-divided into plural sub-blocks. Data representing the sub-blocks is then stored in memory, but together with header data blocks which point to the respective sub-blocks data for the block which the header data relates to.

The header data blocks are stored at memory locations that are predictable. This allows the header blocks to be readily retrieved in use.

As the header data blocks are stored at predictable memory locations, that reduces the constraints on storing the rest of the data. For example, there is no need to store the data for the individual sub-blocks at fixed or predefined memory locations, nor in fixed-sized memory locations, as the header data block information can be used to retrieve the sub-blocks' data.

Also, by dividing the data array into blocks and sub-blocks in this manner, the stored data can effectively be accessed randomly at the data block and sub-block level (i.e. random access is available to the individual blocks and sub-blocks that the data array is divided into).

The effect of this is that the technology described herein can provide a data storage arrangement that can link variable sized compressed data in memory whilst still allowing random access to parts of that data. It can also provide energy efficient access patterns and allow multiple encoders to encode a data stream (array) in parallel. When it is used for compressed texture data, the technology described herein can allow variable-sized compressed texture data to be fetched without needing to decompress the entire texture data array. When used for other data, such as the frame buffer in graphics, it can facilitate simple rotation and cropping, for example. This can all help to reduce bandwidth and power on a system level.

The data array that is to be stored in the technology described herein can be any suitable data array. It should comprise a plurality of data elements (entries), each occupying different positions in the array. The data array in an embodiment represents an image.

As discussed above, in an embodiment the data array is a graphics texture. The graphics texture may be, and in an embodiment is, compressed before being stored in the manner of the technology described herein.

However, the technology described herein is not exclusively applicable to graphics textures, and may equally be used for other forms of data array, e.g. image. For example, the Applicants believe the technology described herein may be equally useful for storing frame buffer data (for use as a frame buffer format), e.g. in graphics processing systems and for use with display controllers, as it can, for example, give predictable memory read patterns for a display controller and facilitate simple rotation and cropping when used as a frame buffer format. Thus, in an embodiment the data array is a frame of data to be stored in a frame buffer, e.g. for display.

In an embodiment, the technology described herein is used both when storing texture data and as the frame buffer format in a graphics processing system. Thus, the technology described herein also extends to a graphics processing system and to a graphics processor that uses the arrangement of the technology described herein both for storing texture data and as its frame buffer format.

The technology described herein may also be used, for example, in image signal processing (image signal processors) and video encoding and decoding (video encoders and decoders).

The blocks that the data array (e.g. texture) to be stored is divided into can take any suitable and desired form. Each block should comprise a sub-set of the data elements (positions) in the array, i.e. correspond to a particular region of the array. In an embodiment the array is divided into non-overlapping and regularly sized and shaped blocks. The blocks are in an embodiment square, but other arrangements could be used if desired. The blocks in an embodiment correspond to a block size that will otherwise be used in the data processing system in question. Thus, in the case of a tile-based graphics processing system, the blocks in an embodiment correspond to (have the same size and configuration as) the tiles that the rendering process of the graphics processing system operates on.

(As is known in the art, in tile-based rendering, the two dimensional output array of the rendering process (the "render target") (e.g., and typically, that will be displayed to display the scene being rendered) is sub-divided or partitioned into a plurality of smaller regions, usually referred to as "tiles", for the rendering process. The tiles (sub-regions) are each rendered separately (typically one after another). The rendered tiles (sub-regions) are then recombined to provide the complete output array (frame) (render target), e.g. for display.

Other terms that are commonly used for "tiling" and "tile based" rendering include "chunking" (the sub-regions are referred to as "chunks") and "bucket" rendering. The terms "tile" and "tiling" will be used herein for convenience, but it should be understood that these terms are intended to encompass all alternative and equivalent terms and techniques.)

In an embodiment, the data array is divided into 8×8, 16×4 or 16×16 blocks (i.e. blocks of 8×8, 16×4 or 16×16 array positions (entries)). In an embodiment, 16×16 blocks are used. Thus, in the case of a texture map, for example, each block will in an embodiment correspond to 16×16 (or 8×8 or 16×4) texels, and in the case of a frame for the frame buffer, each block will in an embodiment correspond to 16×16 (or 8×8 or 16×4) pixels or sampling positions of the frame. Other arrangements would, of course, be possible.

The individual blocks of the data array can similarly be divided into any suitable and desired set of sub-blocks. Again, the sub-blocks should comprise a sub-set of the data elements (positions) that the block relates to, are in an embodiment non-overlapping and regularly-sized and shaped, and are in an embodiment square (at least where the data blocks themselves are square). Other arrangements would, of course, be possible. In an embodiment, each data block is divided into 4×4 data position sub-blocks. Where 16×16 data blocks are used, each data block may accordingly be divided into sixteen 4×4 data position (data element) sub-blocks.

The data that is stored for each sub-block can take any suitable and desired form, and will depend, as will be appreciated by those skilled in the art, upon the nature of the data being stored, e.g. whether it is a texture, a frame for the frame buffer, whether and how it has been encoded, compressed, etc. The stored sub-block data should be some or all of the data that is required for and/or that relates to, the data array positions (entries) that the sub-block corresponds to (represents).

As will be discussed further below, in some embodiments a separate set of sub-block data is stored for each respective sub-block that a block of the data array has been divided into. In this case, the number of sets of sub-block data that are stored for the block of the data array in question will be equal to the number of sub-blocks that the block of data array has been divided into.

In other embodiments, plural sub-blocks of the sub-blocks that a block of the data array has been divided into share the same set of sub-block data. In this case, one (and only one) set of sub-block will be stored for the plural sub-blocks in question, such that the number of sets of sub-block data that are stored for the block of the data array in question will be less than the number of sub-blocks that the block of data array has been divided into. In these arrangements, there may be one set of sub-block data that is shared by (to be used for) all the sub-blocks that the block of the data array in question has been divided into, or the set(s) of sub-block data may be shared by some but not all of the sub-blocks that the block of the data has been divided into. In an embodiment, for at least one of the blocks that the data array has been divided into, only one set of sub-block data that is to be used for all the sub-blocks that the block of the data array in question has been divided into is stored.

The data that is stored for a sub-block may indicate directly the data array values for the data array elements (positions) that the sub-block corresponds to, or it may be data from which these data array values can be derived (i.e. data to be used to, and to allow, the data array values for the data array elements (positions) to be determined). The latter will be the case where, for example, the stored data array is encoded and/or compressed before being stored. Thus, in an embodiment, the technology described herein comprises encoding, e.g. compressing, the original data entries in the data array, to generate an encoded, e.g. compressed, representation of the data values for those data entries, and then storing the encoded, e.g. compressed, representation of the data values as the data for the sub-blocks.

In the case of a texture, for example, the data that is stored for a sub-block should be data to allow appropriate texture data (texel values) for the sub-block to be determined. Such texture data could comprise, e.g., a set of colour values (Red, Green, Blue (RGB), a set of colour and transparency values (Red, Green, Blue, Alpha (RGBa)), a set of luminance and chrominance values, a set of shadow (light)-map values, a set of a normal-map (bump-map) values, z values (depth values), stencil values, luminance values (luminance textures), luminance-alpha-textures, and/or gloss-maps, etc.

In the case of a frame for display, to be stored in a frame buffer, the data that is stored for a sub-block should be data to allow appropriate pixel and/or sampling position data (values) for the sub-block to be determined. Such pixel data could comprise, e.g., appropriate colour (RGB) values, or luminance and chrominance values.

The data for the data array can be processed to generate the data for the sub-blocks and the header data blocks in any suitable and desired manner. For example, a suitable processor or processing circuitry may read the original data array to be stored from memory, and/or receive a stream of data corresponding to the original data array to be stored, and then process the stream of data accordingly, i.e. to divide it into blocks and sub-blocks, and generate the necessary header data blocks and, e.g. encoded, sub-blocks' data, and then store the data in memory.

The data representing (for) the sub-blocks can be stored in memory in any desired and suitable manner and arrangement. As discussed above, there is no requirement to store this data (the sub-blocks) at predictable or pre-defined memory locations, as the header data blocks contain the necessary information to allow the sub-blocks to be located in memory.

In an embodiment, the set of sub-blocks for a given data block (the data representing the sub-blocks in the set of sub-blocks for a data block) are stored at contiguous locations, one after another, in memory. As will be discussed further below, this can reduce the amount of data that the header data blocks need to contain to allow the sub-blocks to be retrieved.

Similarly, in an embodiment, the sets of sub-blocks for a given data array (i.e. the respective sets of sub-blocks for each block that the data array has been divided into) are stored together in the memory, one-after-another. In an embodiment, the sets of sub-blocks for a data array are stored in a body buffer in memory that has been assigned (set aside) for this purpose.

The sets of sub-blocks for a data array are in an embodiment stored using the same sub-block order within each stored set of sub-blocks. The order that the sub-blocks within each set of sub-blocks are stored in in the memory is in an embodiment an order that tends to ensure that spatially adjacent sub-blocks in the block of data that the sub-blocks relate to will be stored next to each other in memory (i.e. an order that tends to preserve the locality of the sub-blocks and that will allow any spatial coherence between the blocks to be exploited). This is good for caching and can facilitate storing the sub-blocks in a more compressed manner (as will be discussed further below). Thus, in an embodiment, the sub-blocks for a block (and for each block) that the data array has been divided into are processed in and stored in memory in an order that follows a space-filling curve, such as a Peano curve, a Hilbert curve, U-order, Morton (Z)-order, etc.

The sets of sub-blocks for a data array may be stored in the order of the blocks of the data array to which they relate, but this is not necessary. In an embodiment, they are stored in the raster order of the blocks. In another embodiment the sets of sub-blocks are stored in an order that tends to ensure that spatially adjacent blocks in the data array will be stored next to each other in memory (i.e. an order that tends to preserve the locality of the data blocks). This may be good for caching. Thus, in an embodiment, the data blocks that the data array has been divided into are processed in and stored in memory in an order that follows a space-filling curve, such as a Peano curve, a Hilbert curve, U-order, Morton (Z)-order, etc.

In an embodiment, the stored sub-blocks are simply stored continuously in memory. In this case, if the data array is being encoded and stored using plural different encoders, then in an embodiment it is ensured that each encoder before it starts encoding has access to a continuous set of memory that can store at least one complete uncompressed set of sub-blocks (i.e. a complete uncompressed set of sub-blocks for one block that the data array has been divided into). In an embodiment this is achieved by dividing the memory (e.g. buffer) allocated for storing the data array into n parts, where n is the number of encoders being used, and allocating one part to each encoder. If an encoder then fills its memory part, in an embodiment the encoder is then allocated some of the space (such as half the space) allocated to another encoder and continues its encoding.

In another embodiment, the stored sub-blocks are arranged in fixed size, and in an embodiment aligned, blocks in memory. Each such "sub-block storage" block in an embodiment contains a fixed number of bytes of data, such as 1024 bytes of data. Arranging the data for the sub-blocks in blocks in memory in this manner can also facilitate encoding a data array using several different encoders in parallel, as each encoder can allocate a new memory block (e.g. through a central repository) every time it runs out of space (in its current sub-block storage "block").

In such arrangements, one set of sub-blocks could be stored per sub-block storage block. This would then facilitate updating stored blocks of the data array on an individual basis. This may be useful where only individual parts of the data array are likely to need to be updated, such as in the case of GUIs and some textures.

Alternatively, in such arrangements, a given set of sub-blocks (i.e. the sub-blocks for a given data block that the data array has been divided into) may be allowed to be stored in two separate sub-block storage blocks if required, i.e. a given set of sub-blocks can be allowed to span two different sub-block storage blocks in memory. As will be discussed below, the header data block for such a set of sub-blocks can in an embodiment indicate this when this has happened. This can be used to avoid the need to leave any "empty" space in a given sub-block storage block where the block in memory cannot be filled completely by complete sets of sub-blocks.

The header data blocks can similarly be stored in memory in any desired and suitable manner and arrangement. In an embodiment all the header data blocks for a data array are stored together, in a given part of the memory, which can accordingly be thought of as a "header buffer" for the stored data array. Thus, in an embodiment, all the header data blocks for a given data array are stored in a header buffer for the data array.

The header data blocks should be stored at predictable memory addresses (locations). In an embodiment, they are stored at memory addresses (locations) that can be predicted from (that are determined from) the position of a data element and/or of the data block in the array that the header data block relates to. Thus, the storage location (memory address) of each header data block (e.g. within a header buffer having a known location in memory) is in an embodiment dependent upon the position within the data array of the block of the data array that the header data block relates to.

In an embodiment, the storage location (memory address) for a header data block, relative to the start location (address) of the header buffer for a data array, is determined by means of a predetermined function of the relative position of the data block (or data element) within the data array that the header data block relates to. In an embodiment, for a data array having vertical and horizontal dimensions xsize and ysize, respectively, and divided into a×a-sized data blocks, and having a header data block size h (in bytes), then if A is the start address of the header buffer in memory, the memory address (location) of the header data block for a given data element of the array (e.g. texel/pixel) at position x, y is given by:

$$\text{header data block address} = A + h*(x/a + (y*x\text{size})/a)$$

Thus, for a block size of 16×16 array entries, with 16-byte header data blocks, the address of the header data block for a given data element of the array (e.g. texel/pixel) at position x, y will be given by:

$$\text{header data block address} = A + 16*(x/16 + (y*x\text{size})/16).$$

Similarly, for a block size of 16×16 array entries, with 64-byte header data blocks, the address of the header data block for a given data element of the array (e.g. texel/pixel) at position x, y will be given by:

$$\text{header data block address} = A + 64*(x/16 + (y*x\text{size})/16).$$

In an embodiment, these divisions are done as integer divisions, rounding down. In an embodiment, the array width ("xsize") is set to an exact multiple of the block size (a). If necessary the data array can be padded with dummy data to achieve this (which dummy data can then be appropriately cropped by the decoder, if required).

There will be one header data block for each block that the data array is divided into. As discussed above, each header data block will contain pointer data indicating the location in memory of the data for the sub-blocks for the block of the data array that the header data block relates to. Such pointer data can take any desired and suitable form. It could, for example, indicate directly the memory location (address) of the sub-block data, or indicate it indirectly, e.g., as an offset from some other (known) memory location (address).

The header data blocks could include separate pointers to each of their respective sub-blocks, but in an embodiment, the header data block includes pointer data to a base, e.g., start, location (a base, e.g. start, address) in memory where the set of sub-blocks that the header relates to are stored, with the locations of the individual sub-blocks then being derived from that base, e.g., start, memory location. This can help to reduce the amount of pointer data that needs to be stored in each header data block. In an embodiment, the pointer data to the base location in memory for the set of sub-blocks that the header relates indicates the offset (in an embodiment in bytes) from the start in memory of the header buffer for the data array in question to the start in memory of the stored set of sub-blocks that the header in question relates to.

In such an arrangement, particularly where the sub-blocks for a given data block are stored contiguously in memory (as discussed above), then the memory location of an individual sub-block is in an embodiment derived from the base "set of sub-blocks" location by using the size of the sub-blocks in memory (i.e. the memory space occupied by the data that has been stored for the sub-blocks) to step from the base memory location to the (data for the) sub-block of interest. Thus, for example, if the second sub-block is required, its location (the location of its data) will be derived, for example, by adding the indicated size of the first sub-block in memory to the indicated base memory location for the set of sub-blocks.

Thus the header data blocks in an embodiment include data indicating the sizes in memory of the stored sub-blocks (of the stored data for the sub-blocks) that the header data block relates to, e.g. in bytes, i.e. an indication(s) of (a size indication value(s) indicating) the amount of memory (in an embodiment in bytes) that has been used to represent (signal) the data for the sub-blocks that the header data relates to. This then means that the decoder (for example) wishing to retrieve the stored sub-block data can determine the location of the sub-block data from reading the header data block alone (and so, e.g., avoids the need for reads from plural different places to determine the memory location of the sub-block data of interest).

Thus, in an embodiment, the header data blocks include pointer data indicating a base (e.g. start) memory location for the data for the set of sub-blocks that the header corresponds to, together with data indicating a size (in memory) for the data for some or all, and in an embodiment for each, of the sub-blocks in the set of sub-blocks. In this case, the location in memory where the data for a sub-block is stored will accordingly be indicated by the combination of the pointer indicating the base memory location and the appropriate sub-block size indication(s). Each sub-block should correspondingly be stored in the memory at the location corresponding to the indicated sizes of the preceding sub-blocks (i.e. the sizes of the sub-blocks that are stored before it) (relative to the base memory location for the set of sub-blocks in question).

In an embodiment, there is a separate size indication (field) for each sub-block of the set of sub-blocks for the data block that the header relates to. In this case, the header data block will include as many sub-block size indications (fields) as there are sub-blocks in the set of sub-blocks for the data block that the header relates to. Each sub-block size indication should indicate the amount of memory (in an embodiment in bytes) that has been used to represent (signal) the data for the sub-block that the size indication relates to.

The sub-block size indications could indicate the actual size value (e.g. in bytes) to be used when retrieving the sub-block data, or could comprise a value that is to be multiplied by a multiplying factor to derive the value to be used when retrieving the sub-block data. Other arrangements would, of course, be possible.

In these arrangements, there will, accordingly, be a field or fields within the header data block for indicating the sizes of the sub-blocks. Where these fields may be able to indicate sub-block size values that may in fact never be used (e.g. because they will be impossible to achieve with the compression scheme being used), then in an embodiment, such unused size indication values (i.e. size indication values that will not (that will never) be needed to indicate the size of a sub-block) are used to indicate (predetermined) "special" cases, such as an uncompressed block, or a one colour block. It would also be possible to deliberately set a size value (or values) aside for this purpose, if desired, e.g., by encoding encoded blocks that would normally have that size value such that they instead have a different size value. For example, if a block size of, e.g., 63 is used to indicate an uncompressed block, a block which compressed to 63 bytes could instead be sent as an uncompressed block.

Thus, in an embodiment, one or more sub-block size values that may be included in a header data block are predefined as (and set aside for) indicating a particular, special case or cases, such as a particular kind of data block, or a particular kind of sub-block, rather than a "true" sub-block size. This can allow the scheme of the technology described herein to indicate such special cases in a more efficient manner. In an embodiment these special case sub-block size values are sizes that a sub-block could not in practice be stored in, such as 0 or 1.

In an embodiment, one, or more than one, size indication value can be used to indicate that the sub-block to which the size indication relates should be reproduced (decoded) as a copy of another sub-block (i.e. that the data used (stored) for another sub-block should also be used for the sub-block in question). In an embodiment, this size indication comprises a size value of 1 or a size value of 0. The other sub-block that the sub-block is a copy of could be any other sub-block, but in an embodiment is another sub-block of the set of sub-blocks for the block of the data array that the header in question relates to.

In an embodiment, the "copy-block" sub-block size indication used in the header indicates that the sub-block to which the size indication relates is a copy of (is the same as) the previous sub-block (the immediately preceding sub-block in the data array), i.e. that the same data as would be used for the previous sub-block should be used for the sub-block in question. This allows a single size indication value to be used to indicate a "copy-block" sub-block. A series of such sub-block size indications can then be used to indicate a sequence of identical sub-blocks.

To facilitate this, the sub-blocks of each data block are in an embodiment processed, as discussed above, in a particular, predefined order (both for storing them to the memory and reading them from memory) (and in an embodiment in an order that can exploit any spatial coherence between the sub-blocks).

It would also be possible to use a more sophisticated "copy-block" indication arrangement, for example where data blocks are not just considered in relation to their immediately preceding data block but in relation to more than one data block in the data array. In this case, plural "copy-block" size indication values could be set aside, for example, with each such size indication value having a different meaning in relation to which other sub-block the sub-block in question should be copied from (is a copy of).

Having a sub-block size indication that can indicate that a sub-block should be a copy of another sub-block means that a separate set of sub-block data does not need to be stored for the later, "copy" sub-block (as the decoder can re-use the earlier identical sub-block's data instead). Thus, in an embodiment, if a "copy" sub-block is indicated, a separate set of sub-block data is not stored for the "copy" sub-block (and the decoder is configured and triggered to use the data for the other sub-block instead). This further facilitates compression of the data array, as storing of data for duplicated sub-blocks can be avoided. In an embodiment, this is used to encode a constant data value (e.g. constant colour) block in an efficient manner, by storing sub-block data for the first sub-block of the block, but then using the "copy" sub-block size indication for all the remaining sub-blocks and not storing separate sets of sub-block data for those sub-blocks.

Thus, in an embodiment, the encoding process of the technology described herein includes determining if a sub-block of a block of the data array to be encoded can be considered to be the same as another sub-block of the block of the data array (e.g. is sufficiently similar to another sub-block of the block of the data array that that other sub-block could be used in place of the sub-block in question), and if it can be, including as pointer data (and in an embodiment as a size indication) for that sub-block in the header data block for the block of the data array in question, a data value (and in an embodiment a size indication value) that has been predefined as indicating that the sub-block to which the pointer data value (e.g. size indication value) relates is a copy of another sub-block.

Similarly, in an embodiment, the encoding process of the technology described herein includes determining for each sub-block of a block of the data array to be encoded, if the sub-block can be considered to be the same as another sub-block of the block of the data array, and if it can be, including as pointer data for that sub-block in the header data block for the block of the data array in question, a data value that has been predefined as indicating that the sub-block to which the pointer data value relates is a copy of another sub-block.

In these embodiments, the question of whether a sub-block can be considered to be the same as another sub-block of the block of the data array can be determined as desired, e.g. by comparing the (original) content of the sub-blocks.

In these embodiments, the process in an embodiment further comprises not storing a separate set of sub-block data in memory for a sub-block that it has been determined can be considered to be the same as another sub-block of the data array. (In this case, the decoder should be configured to then re-use the sub-block data stored for the another sub-block for the later, "copy" sub-block (and these sub-blocks will accordingly share the same set of stored sub-block data).)

It is believed that the use of "copy-block" indications in the above manner may be particularly advantageous. Thus, another embodiment of the technology described herein comprises a method of storing an array of data in memory, the method comprising:
  dividing the array of data to be stored into a plurality of sub-blocks;
  storing data to be used to reproduce each respective sub-block of the data array in memory; and
  storing, for each respective sub-block that the data array has been divided into, pointer data in a header data buffer to be used to determine the location in memory where the data to be used to reproduce the sub-block of the data array that the pointer data relates to is stored;
  wherein at least one of the pointer data values that can be included in the header data buffer for a sub-block is predefined as indicating that the data stored for another sub-block should be used for the sub-block to which the pointer data value relates.

Another embodiment of the technology described herein comprises an apparatus for storing an array of data in memory, the apparatus comprising:
  processing circuitry configured to:
  divide the array of data to be stored into a plurality of sub-blocks;
  store data to be used to reproduce each respective sub-block of the data array in memory; and
  store, for each respective sub-block that the data array has been divided into, pointer data in a header data buffer to be used to determine the location in memory where the data to be used to reproduce the sub-block of the data array that the pointer data relates to is stored;
  wherein at least one of the pointer data values that can be included in the header data buffer for a sub-block is predefined as indicating that the data stored for another sub-block should be used for the sub-block to which the pointer data value relates.

In some embodiments, the processing circuitry may be in communication with one or more memory devices that store the array of data and/or store the data described herein and/or store software for performing the processes described herein. The processing circuitry may also be in communication with a display for displaying images based on the data described above, or a graphics processor for processing the data described above.

Another embodiment of the technology described herein comprises a stored set of data (and/or data format) representing an array of data to be used in a data processing system, comprising:
  a plurality of sets of sub-block data, each set of sub-block data relating to a sub-block that the data array has been divided into; and
  a set of header data containing pointer data for each sub-block that the data array has been divided into indicating the location in memory where the set of sub-block data for the respective sub-block is stored;
  wherein at least one of the pointer data values that can be included in the header data for a sub-block is predefined as indicating that the data stored for another sub-block should be used for the sub-block to which the pointer data value relates.

In one example implementation, the stored set of data is stored on a computer-readable storage medium in the data format described above.

Another embodiment of the technology described herein comprises a method of storing an array of data in memory, the method comprising:
  dividing the array of data to be stored into a plurality of sub-blocks;
  storing data to be used to reproduce each respective sub-block of the data array in memory; and
  storing, for each respective sub-block that the data array has been divided into, pointer data in a header data buffer to be used to determine the location in memory where the data to be used to reproduce the sub-block of the data array that the pointer data relates to is stored; wherein the method further comprises:
  determining for each sub-block of a block of the data array to be encoded, if the sub-block can be considered to be the same as another sub-block of the block of the data array, and if it can be, including as pointer data for that sub-block in the header data block for the block of the data array in question, a data value that has been predefined as indicating that the sub-block to which the pointer data value relates should be decoded using the data for another sub-block.

Another embodiment of the technology described herein comprises an apparatus for storing an array of data in memory, the apparatus comprising:
  processing circuitry configured to:
  divide the array of data to be stored into a plurality of sub-blocks;
  store data to be used to reproduce each respective sub-block of the data array in memory; and
  store, for each respective sub-block that the data array has been divided into, pointer data in a header data buffer to be used to determine the location in memory where the data to be used to reproduce the sub-block of the data array that the pointer data relates to is stored;

wherein the processing circuitry is further configured to:

determine for each sub-block of a block of the data array to be encoded, if the sub-block can be considered to be the same as another sub-block of the block of the data array, and if it can be, to include as pointer data for that sub-block in the header data block for the block of the data array in question, a data value that has been predefined as indicating that the sub-block to which the pointer data value relates should be decoded using the data for another sub-block.

In some embodiments, the processing circuitry may be in communication with one or more memory devices that store the array of data and/or store the data described herein and/or store software for performing the processes described herein. The processing circuitry may also be in communication with a display for displaying images based on the data described above, or a graphics processor for processing the data described above.

All these embodiments of the technology described herein may include any one or more or all of the other features of the technology described herein, as appropriate.

Thus, in an embodiment if it is determined that a sub-block can be considered to be the same as another sub-block of the data array, a separate set of sub-block data is not stored for the sub-block, but if it is determined that a sub-block cannot be considered to be the same as another sub-block of the data array, a separate set of sub-block data is stored for the sub-block.

In an embodiment, one size indication value is predefined as indicating a "copy" sub-block (as discussed above) and another size indication value is predefined as indicating an uncompressed sub-block (i.e. a sub-block that is stored in an uncompressed form).

Where, as discussed above, the data for a set of sub-blocks may extend across two sub-block storage blocks in the memory, then the header data block in an embodiment indicates this. In an embodiment this is done by including pointer data both to the location of the data for the set of sub-blocks in the first sub-block storage block and pointer data to the location of the data for the set of sub-blocks in the second sub-block storage block in the header data block.

The header data blocks may be configured and arranged as desired. In an embodiment, each header data block is of a size that is suitable for (and in an embodiment optimised for) fetching and caching in the data processing system in question. Thus, the header data blocks in an embodiment correspond to a fraction of or all of the amount of data that the data processing system can and will (typically) fetch in a single burst (i.e. to all or a fraction of a burst size that the data processing system commonly uses). Where the header data blocks correspond to a fraction of the overall burst size, in an embodiment the arrangement is such that an integer number of header data blocks exactly fill one burst. This makes the process of fetching the header data blocks "burst friendly". The header data blocks are all in an embodiment the same, fixed, size. A suitable header data block size to achieve this is 16 or 64 bytes. In an embodiment each header data block occupies 16 bytes.

In one embodiment, each header data block contains both the pointer data and other useful data. This may particularly be possible where the header data blocks are configured to match the burst size (e.g. 64 bytes), as in that case it may be that each header data block will have the capacity to include more data than just the pointer data. In an embodiment, any such extra header data block data capacity is filled, at least in part, with other useful data. Such other useful data could, for example, and in an embodiment does, include data that is to be used in common for the sub-blocks that the header data block relates to when decoding the sub-blocks. It could also or instead, include data relating to a specific sub-block, although in an embodiment such data is only included in a header data block if there is still space after any "common" (shared) data has been included in the header data block). This can help to enhance the efficiency of the data storage arrangement of the technology described herein.

Thus, in an embodiment, the header data blocks are of a predefined, fixed size, in an embodiment corresponding to a burst size of the data processing system in question, and any unused space in a header data block after the pointer data (and any other sub-block location data) has been included in the header data block is filled with other useful data. The other useful data is in an embodiment data that is to be used in common for (e.g. when decoding) the sub-blocks that the header data block relates to, followed by data for specific sub-blocks (if any space remains in the header data block). For certain forms of block, such as single colour blocks, it may in fact be possible to include all the encoded data for the block in the header data block (such that there will then be no need for any separate sub-block data for the block). (In this latter case, the data representing each sub-block of the block would accordingly be stored in the header data block itself, and the pointer data in the header data block should be configured to indicate that.)

In another embodiment, each header data block contains only pointer data indicating the location in memory where the data for the sub-blocks for the block of the data array that the header data block relates to is stored. As discussed above, this pointer data in an embodiment comprises (and thus each header data block in an embodiment only contains) an indication of a base memory location for the sub-blocks' data together with a separate size indication value for each individual sub-block. In this case, in an embodiment each header data block occupies 16 bytes.

This arrangement has the advantage that as the header data blocks don't contain any (useful (payload)) sub-block data, it is not necessary to decode both data from the header data block and data from a sub-block when it is desired to decode a sub-block (rather all the data needed to decode a sub-block will be stored as a set of sub-block data). This then means that the sub-blocks can be individually and independently decoded without the use of data that is stored elsewhere (e.g. in a header data block) and will allow the decoder simply to read data from consecutive memory addresses when decoding a given sub-block. Thus, this embodiment can reduce the decoder's random access read overhead and implementation complexity.

As discussed above, the data array storing and encoding of the technology described herein can be used to store various different formats of data array, such as RGB data, YUV data, etc.

In one embodiment, each respective stored set of sub-block data relates to all of the components of the data array. In an embodiment this is done for RGB and RGBA data (such that in this case each stored sub-block will comprise, e.g., a 3 or 4 component texture, representing the respective RGB or RGBA data).

In other embodiments, each sub-block relates to less than all of the different data components of the data array, such as only one or only two of plural data components. In an embodiment this is done for YUV data. In an embodiment, the luminance (Y) data component is stored in separate sub-blocks to the chrominance (UV) data components. In this embodiment, each luminance sub-block is in an embodiment a single component texture, and each chrominance sub-block is a two-component texture (storing the UV values). This then allows the luminance values to be decoded independently of the chrominance values (and vice-versa). This is advantageous, as in video encoding and decoding, for example, it is not always necessary to read luminance and chrominance values at the same time.

Thus, in an embodiment where the data array comprises YUV values, each block of the data array is divided into a plurality of sub-blocks for storage (encoding) purposes, with some of the sub-blocks storing (relating to) the luminance values (only), and others of the sub-blocks storing (relating to) the chrominance values (only).

In these arrangements, the different data components could be stored at the same resolution, but in an embodiment, one (or more) of the data components is stored at a lower resolution than the other data component(s). For example, in an embodiment, the luminance (Y) values are stored at a higher resolution than the chrominance (UV) values. In this case, there may accordingly be more sub-blocks stored for a given block of the data array for the higher resolution data component(s) than for the lower resolution data component(s).

Thus, in an embodiment, different sub-blocks are used to store different components of the data array, and more sub-blocks are stored for each block of the data array for one of the data component(s) than for another of the data component(s).

For example, for YUV420 format data, in an embodiment each 16×16 block of the data array is subdivided into 16 luma-only sub-blocks and 4 chroma-only sub-blocks (with each sub-block representing 4×4 data entries). Similarly, for YUV422 format data, in an embodiment each 16×16 block of the data array is subdivided into 16 luma-only sub-blocks and 8 chroma-only sub-blocks (with each sub-block representing 4×4 data entries).

Where different sub-blocks are used to store different components of the data array, in an embodiment, the sub-blocks representing the different data components are stored in an interleaved fashion in the memory (i.e. the sub-blocks representing the different data components are interleaved as they are stored in the memory). Thus, in an embodiment, the chroma-only sub-blocks for a given block of a YUV data array are interleaved with the luma-only sub-blocks for the block of the data array. Such interleaving in an embodiment is configured to store the respective data component sub-blocks such that the different data component sub-blocks for a given region of the block of the data array will tend to be stored close to each other in the memory. Thus, for example, for YUV420 and YUV422 data, each chroma sub-block is preferably stored between two of the luma sub-blocks that the chroma sub-block corresponds to (is to be used with). Again, the sub-blocks, including the interleaving, are preferably stored in an order that follows a space-filling curve that will tend to exploit spatial coherence between the sub-blocks.

Where different sub-blocks are used to store different data components, then if a "copy" block is indicated (as discussed above), the decoder should copy (reuse) the relevant (e.g. the immediately preceding) sub-block for the data component(s) in question.

Although the technology described herein has been described above with particular reference to the storing of the data for the data array, as will be appreciated by those skilled in the art, the technology described herein also extends to the corresponding process of reading (and decoding) data that has been stored in the manner of the technology described herein.

Thus, another embodiment of the technology described herein comprises a method of determining the value of a data element of a stored data array in a data processing system, the method comprising:
  determining the memory location of a stored header data block for a block of the data array that the data element falls within;
  reading the header data block and determining therefrom pointer data indicating the memory location of data representing a sub-block of the block of the data array that the data element falls within; and
  using the sub-block data from the determined memory location to determine the value of the data element.

Another embodiment of the technology described herein comprises an apparatus for determining the value of a data element of a stored data array in a data processing system, the apparatus comprising:
  processing circuitry configured to:
  determine the memory location of a header data block for a block of the data array that the data element falls within;
  read the header data block and determine therefrom pointer data indicating the memory location of data representing a sub-block of the block of the data array that the data element falls within; and
  use the sub-block data from the determined memory location to determine the value of the data element.

In some embodiments, the processing circuitry may be in communication with one or more memory devices that store the data described herein and/or that store the determined value of the data element and/or store software for performing the processes described herein. The processing circuitry may also be in communication with a display for displaying images based on the data described above, or a graphics processor for processing the data described above.

As will be appreciated by those skilled in the art, these embodiments of the technology described herein can, and in some embodiments do, include any one or more or all of the optional features of the technology described herein, as appropriate.

Thus, for example, the data processing system is in an embodiment a graphics processing system or a display controller system, and the data array is in an embodiment a graphics texture (in which case the data element is in an embodiment a texel), or a frame for display (in a frame buffer) (in which case the data element is in an embodiment a pixel or a sampling position), etc. Similarly, the apparatus for determining the value of a data element of a stored data array in a data processing system is in an embodiment incorporated in a graphics processor or a display controller.

Similarly, the position of the header data block in memory is in an embodiment determined, in an embodiment in a predetermined manner, from the relative position of the data element within the data array. In an embodiment a pointer to a base memory location and sub-block size data is read from the header data block and used to determine the location of the sub-block data of interest in memory. The use of the sub-block data to determine the value of the data element may include reading the sub-block data from the determined memory location (and then using that read sub-block data to determine the value of the data element), or using a previously read (and, e.g., cached) copy of that data, for example.

These embodiments of the technology described herein may accordingly further include using (and, e.g., reading) further data from the header data block that is to be used together with the sub-block data to determine the value of the data element (and using that further data together with the sub-block data to determine the value of the data element). Such further data in the header data block could comprise, as discussed above, data that is to be used in common for plural sub-blocks (that the header block relates to), and/or data that is specific to a given sub-block (that the header block relates to).

Similarly, the decoding process and system may be configured to recognise particular, predefined, pointer data values (e.g. sub-block size values) in the header data block, and to then determine the value of the data element(s) accordingly. Thus, these embodiments of the technology described herein in an embodiment further comprise, if the pointer data in the header data block for the sub-block has a particular value, using the sub-block data that is to be used for another (and in an embodiment for the preceding) sub-block of the block of the data array that the data element falls within to determine the value of the data element(s).

Thus, another embodiment of the technology described herein comprises a method of determining the value of a data element of a stored data array in a data processing system, the method comprising:

determining the memory location of a stored header data block for a block of the data array that the data element falls within;

reading the header data block and determining therefrom pointer data indicating the memory location of data representing a sub-block of the block of the data array that the data element falls within; and if the pointer data in the header data block for the sub-block has a particular value, using the sub-block data that is to be used for another sub-block of the block of the data array that the data element falls within to determine the value of the data element.

Another embodiment of the technology described herein comprises an apparatus for determining the value of a data element of a stored data array in a data processing system, the apparatus comprising:

processing circuitry configured to:

determine the memory location of a header data block for a block of the data array that the data element falls within;

read the header data block and determine therefrom pointer data indicating the memory location of data representing a sub-block of the block of the data array that the data element falls within; and if the pointer data in the header data block for the sub-block has a particular value, use the sub-block data that is to be used for another sub-block of the block of the data array that the data element falls within to determine the value of the data element.

In some embodiments, the processing circuitry may be in communication with one or more memory devices that store the data described herein and/or that store the determined value of the data element and/or store software for performing the processes described herein. The processing circuitry may also be in communication with a display for displaying images based on the data described above, or a graphics processor for processing the data described above.

As will be appreciated by those skilled in the art, these embodiments of the technology described herein can, and in some embodiments do, include any one or more or all of the optional features of the technology described herein, as appropriate.

The technology described herein also extends to a method and system that both stores and then reads the data for the data array in the manners discussed above.

The methods and apparatus of the technology described herein can be implemented in any appropriate manner, e.g. in dedicated hardware or programmable hardware, and in (and be included in) any appropriate device or component.

The actual device or component which is used to store the data in the manner of the technology described herein will, for example, depend upon the nature of the data array that is being stored. Thus, for example, in the case of a graphics texture, an appropriate processor, such as a personal computer, may be used to generate and store the textures in the manner of the technology described herein, e.g. by an application developer, and the so-stored textures then provided as part of the content of a game, for example. In the case of the stored data array being a frame for display, then it may accordingly be a graphics processor that generates and stores the data in the manner required.

Similarly, on the data reading (decoding) side of the operation, in the case of texture data, for example, it will be a graphics processor that reads (decodes) the stored data array, and in the case of a frame for display, it could be a display controller for a display that reads (decodes) the stored data array.

In an embodiment the technology described herein is implemented in a graphics processor, a display controller, an image signal processor, a video decoder or a video encoder and thus the technology described herein also extends to a graphics processor, a display controller, an image signal processor, a video decoder or a video encoder configured to use the methods of the technology described herein, or that includes the apparatus of the technology described herein, or that is operated in accordance with the method of any one or more of the embodiments of the technology described herein. Subject to any hardware necessary to carry out the specific functions discussed above, such a graphics processor, display controller, image signal processor, video decoder or video encoder can otherwise include any one or more or all of the usual functional units, etc., that graphics processors, display controllers, image signal processors, video decoders or video encoders include. In an embodiment, the methods and apparatus of the technology described herein are implemented in hardware, in an embodiment on a single semi-conductor platform.

The technology described herein is particularly, but not exclusively, suitable for use in low power and portable devices. Thus, in an embodiment, the technology described herein is implemented in a portable device, such as a mobile telephone or PDA.

Similarly, the memory where the header data blocks and the sub-block data is stored may comprise any suitable such memory and may be configured in any suitable and desired manner. For example, it may be an on-chip buffer or it may be an external memory (and, indeed, may be more likely to be an external memory). Similarly, it may be dedicated memory for this purpose or it may be part of a memory that is used for other data as well. In an embodiment, this data is stored in main memory of the system that incorporates the graphics processor.

In the case of a texture data array, the memory is in an embodiment a texture buffer of the graphics processing system (which buffer may, e.g., be on-chip, or in external memory, as desired). Similarly, in the case of a frame for the display, the memory is in an embodiment a frame buffer for the graphics processing system and/or for the display that the graphics processing system's output is to be provided to.

The header block data and the sub-blocks data is in an embodiment stored in the same physical memory, although this is not essential.

Other memory arrangements would, of course, be possible.

The technology described herein can be implemented in any suitable system, such as a suitably configured microprocessor based system. In an embodiment, the technology described herein is implemented in computer and/or microprocessor based system.

The various functions of the technology described herein can be carried out in any desired and suitable manner. For example, the functions of the technology described herein can be implemented in hardware or software, as desired. Thus, for example, the various functional elements of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor and/or share processing circuitry.

The technology described herein is applicable to any suitable form or configuration of graphics processor and renderer, such as tile-based graphics processors, immediate mode renderers, processors having a "pipelined" rendering arrangement, etc.

It will also be appreciated by those skilled in the art that all of the described embodiments of the technology described herein can include, as appropriate, any one or more or all of the optional features of the technology described herein.

The methods in accordance with the technology described herein may be implemented at least partially using software e.g. computer programs. It will thus be seen that further embodiments of the technology described herein comprise computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processing system may be a microprocessor, a programmable FPGA (Field Programmable Gate Array), etc.

The technology described herein also extends to a computer software carrier (or medium) comprising such software which when used to operate a graphics processor, renderer or other system comprising data processing means causes in conjunction with said data processing means said processor, renderer or system to carry out the steps of the methods of the technology described herein. Such a computer software carrier could be a physical storage medium such as a ROM chip, RAM, flash memory, CD ROM or disk.

It will further be appreciated that not all steps of the methods of the technology described herein need be carried out by computer software and thus further broad embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described.

FIG. 1 shows schematically the way that an array of original data 20 is stored in a first embodiment of the technology described herein.

The array of original data 20 is a two-dimensional data array containing a plurality of data elements (containing data entries at a plurality of particular positions within the array). The data array 20 could be any suitable and desired array of data, but in a graphics processing context, it could, for example, be a texture map (i.e. an array of texture elements (texels)), or an array of data representing a frame to be displayed (in which case the data array may be an array of pixels to be displayed). In the case of a texture map, each data entry (position) in the data array will represent an appropriate texel value (e.g. a set of colour values, such as RGBa, or luminance and chrominance, values for the texel). In the case of a frame for display, each data entry (position) in the array will indicate a set of colour values (e.g. RBG values) to be used for displaying the frame on a display.

As shown in FIG. 1, to store the data array 20 in memory, the data array 20 is first divided into a plurality of non-overlapping, equal-size and uniform blocks 21, each block corresponding to a particular region of the data array 20. In the present embodiment, each block 21 of the data array corresponds to a block of 16×16 elements (positions) within the data array 20 (i.e. a block of 16×16 texels in the case of a texture map). Other arrangements would, of course, be possible.

Each block 21 that the data array 20 is divided into is further sub-divided into a set of sixteen non-overlapping, uniform and equal-size sub-blocks 22. In the present case, as each block 21 corresponds to 16×16 elements (positions) within the data array, each sub-block 22 accordingly corresponds to a 4×4 data element region within the block 21 (e.g. 4×4 texels in the case of a texture map). (FIG. 1 only shows the division of a few of the blocks 21 of the data array 20 into sub-blocks for simplicity. However, each and every block 21 that the original data array 20 is divided into is correspondingly sub-divided into a set of plural sub-blocks 22.)

To store the data array 20 in memory, firstly a header data block 23 is stored for each block 21 that the data array 20 has been divided into. These header data blocks are stored in a header buffer 24 in memory. The header buffer 24 starts at a start address A in memory, and the header data blocks 23 are each stored at a predictable memory address within the header buffer 24.

FIG. 1 shows the positions of the header data blocks 23 in the header buffer 24 for some of the blocks 21 that the data array 20 is divided into. Each block 21 that the data array 20 is divided into has a corresponding header data block 23 in the header buffer 24.

The position that each header data block 23 is stored at within the header buffer 24 is determined from (predicted from) the position within the data array of the block 21 that the header data block 23 relates to. In particular, the address of the header data block 21 in the header buffer 24 for a data array element (e.g. texel or pixel) at a position x, y within the data array 20 is given by:

$$\text{header data block address} = A + 64*(x/16 + (y*\text{xsize})/16)$$

where A is the start address of the header buffer, xsize and ysize are the vertical and horizontal dimensions, respectively, of the data array 20, it is assumed that the data array 20 is divided into 16×16 blocks and each header data block occupies 64 bytes, the divisions are done as integer divisions (rounding down), and the array width (xsize) is an exact multiple of the block size. (If necessary, padding data can be added to the input data array to ensure that it has a width (and height) evenly divisible by the block size (in this case 16) (such padding data can then be appropriately cropped by the decoder when decoding the data array if required).)

In the present embodiment, each header data block 23 in the header buffer 24 has the same, fixed size, corresponding to the burst-size, such as 64-bytes, used by the data processing system in which the stored data array is to be used. This means that the header data blocks 23 are of a size that can be fetched using a system-friendly burst size.

As well as storing a respective header data block 23 in the header buffer 24 for each block 21 that the original data 20 is divided into, the data storage arrangement of the present embodiment also stores data for each sub-block 22 that a given data block is divided into. This sub-block data is stored in memory in sub-block storage or body blocks 25, which comprise in the present embodiment aligned blocks of 1024 bytes. (Having the body blocks storing the sub-block data in 1024 byte sub-block storage blocks provides the ability to encode the data array with several different encoders in parallel, by each encoder allocating a new body block 25 through a central repository every time it runs out of space.) In the present embodiment, the body blocks 25 are stored directly after the header buffer 24 (but may appear in random order there). This allows the pointer data in the header data blocks to be in the form of offsets from the start or end of the header buffer 24. (This is not essential, and the body blocks 25 may reside anywhere in memory, if desired.)

The sets of data 26 for each respective set of sub-blocks are stored in the body blocks one after another, as shown in FIG. 1. This has the effect then that the data for a set of sub-blocks 22 for a given 16×16 block 21 can span two different body blocks 25 (as shown in FIG. 1 for the set 27 of sub-block data).

Figure 2:
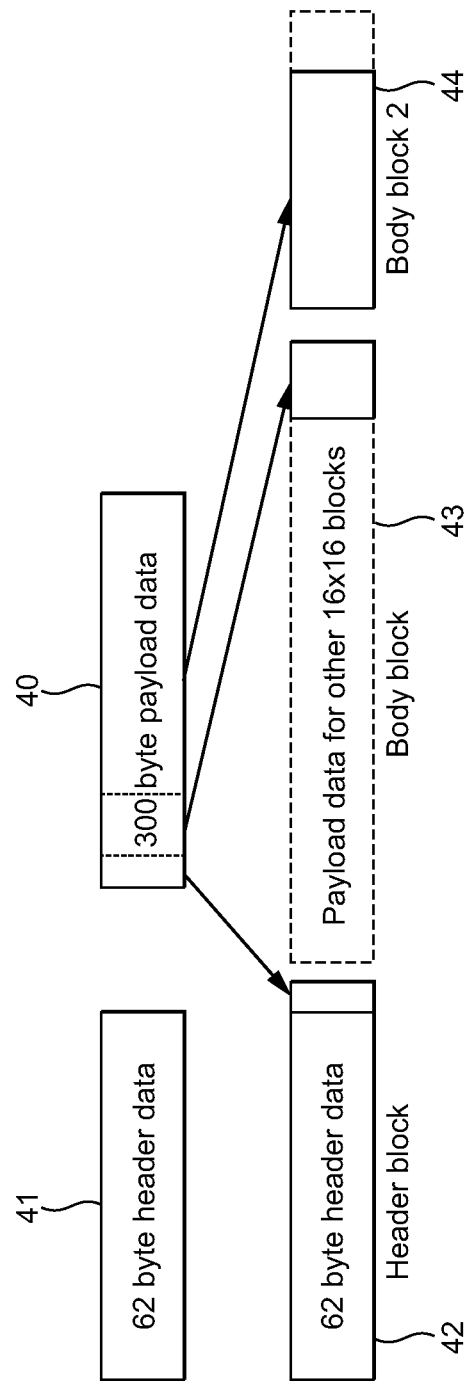
FIG. 2 shows schematically the distribution of data for a block of a data array between a header data block and body blocks in memory in a first embodiment of the technology described herein.

FIG. 2 shows this in more detail. If it is assumed that the "payload" data 40 to be stored for the set of 4×4 sub-blocks corresponding to a given 16×16 block of the data array comprises 300 bytes, and the header data 41 to be stored for the block comprises 62 bytes, as shown in FIG. 2, then if the header block 42 has a capacity of 64 bytes, the first two bytes of "payload" data will be stored in the header block, and then the remaining bytes of payload data distributed between one or two body blocks 43, 44 (depending upon the available space in the first body block). (Typically, the sub-block "payload" data will be stored in the header block and 0-2 body blocks, depending on the amount of that data and the available capacity in the respective header and body blocks.)

The header buffer 24 and body blocks 25 may be stored in any suitable memory of the data processing system in question. Thus, for example, they may be stored in an on-chip memory or in an external memory, such as a main memory of the data processing system. They are in an embodiment stored in the same physical memory, but that is not essential.

Some or all of the header buffer and body blocks could also be copied to a local memory (e.g. cached), in use, if desired.

The data that is stored for each sub-block in the body blocks 25 could simply comprise the data in the data array 20 for the corresponding data elements (entries) that the sub-block corresponds to. However, in the present embodiment, rather than storing the data array 20 in its full, original form, each data array sub-block 22 is encoded to give an encoded representation of the original data that has a reduced size as compared to the data in its original, unencoded form. This compresses the original data, thereby making its storage and processing more efficient. Any suitable and desired encoding (compression) process can be used for this encoding.

Thus, in the present embodiment, the original data array 20 is encoded and compressed, before it is stored, so the data that is stored in respect of each sub-block 22 will be data that can be appropriately decoded to derive the data entries for the original data array. In other words, the data that is stored in respect of each sub-block 22 will be data from which the original data elements (or at least a desired approximation to the value of those data elements (e.g. where a lossy encoding (compression) scheme is being used)) can be derived. It will be data that can be used to determine the values of the data elements in the original data array (or at least desired approximations to those original data values) for the data elements in the sub-block in question.

Each header data block contains pointer data indicating the position within a body block 25 where the data for the sub-blocks for the block 21 that that header data block 23 relates to is stored. In the case where the sub-block data for a given data block spans two different body blocks (as illustrated in FIG. 1), the header data block 23 will contain a second pointer to indicate the position of the second body block in which the data for the set of sub-blocks is stored. In the present embodiment, this pointer comprises the upper 22 bits of a 1024 byte aligned address. (In the present embodiment, each header data block contains pointers to both a first and a second body block, irrespective of whether a given block's sub-block data will extend into a second body block. This is to allow for the fact that when the encoding process is started, it may not be known before the data is written to memory whether a second body block will be used or not.)

In the present embodiment, the pointer data in the header data blocks 23 indicates the start position 28 in the body block 25 in memory of the stored data 26 for the respective sub-blocks that the header data block relates to. In order to locate the data for the individual 4×4 sub-blocks, it is accordingly necessary for the decoder to be able to determine the location of the data for the individual 4×4 sub-blocks within the overall set of data 26 for the sub-blocks in question. This is achieved in the present embodiment by including in the header data block 23 the memory size used to store the data for each respective 4×4 sub-block (in bytes).

To locate the data for an individual 4×4 sub-block in a body block 25, the decoder then accordingly uses the pointer in the header data block 23 to determine the start position 28 of the data 26 for the set of sixteen 4×4 sub-blocks that the header data block 23 relates to in the body block 25, and then uses the size information in the header data block 23 to sum the sizes of the stored data for the 4×4 sub-blocks that are stored prior to the 4×4 sub-block of interest, to determine the start position for the data in the body block 25 for the sub-block of interest. The end position of the data for the sub-block of interest is correspondingly determined using the indicated stored data size for the sub-block in question.

Including the sub-block size information in the header data blocks avoids the need to have to read multiple different places in memory in order to identify the memory location of the desired sub-block data.

In the present embodiment, if there are some sizes of stored sub-block data that can be indicated by the size fields in the header data blocks, but which sizes will not in fact occur in use (e.g. because they are impossible to achieve with the compression or encoding scheme that is being used), then those size values are predefined as indicating special cases, such as an uncompressed data block or a one colour block. This facilitates signalling such special cases to the decoder in an efficient manner.

If, after the pointer and sub-block size data has been included in a header data block 23, there is any remaining space in the header data block, then rather than leaving that space unused, it is filled with further useful information, such as, and in particular, data that will be needed to, or that can be used to, determine the values of data elements for the sub-blocks to which the header data block relates (i.e. data to be used to decode the sub-blocks data).

For example, part of the encoded (e.g. compressed) data representing the original data array that is to be used for all of the sub-blocks that the header data block relates to for the decoding process could be included in the "spare" space in the header data block. It would also be possible to include in the header data block data that is specific to a given sub-block if there is any remaining space in the header data block after the data to be used in common by (shared by) all the sub-blocks that the header data block relates to has been included in the header data block. Filling the header data blocks with other useful data such as this means that the header data blocks can be of a size that can be fetched using a system-friendly burst size, without wasting memory space.

In the present embodiment, 64-byte header data blocks are used, and the layout of the header data block is typically a 1 byte exact pointer to a body block (sub-block storage block), occupying e.g. 32 bits, one body block size-aligned pointer to a second body block (which can be 22 bits, as discussed above), 16 sets of sub-block size data (each typically occupying 6-bits), with the rest of the header data block filled with encoded sub-block data.

Figure 3:
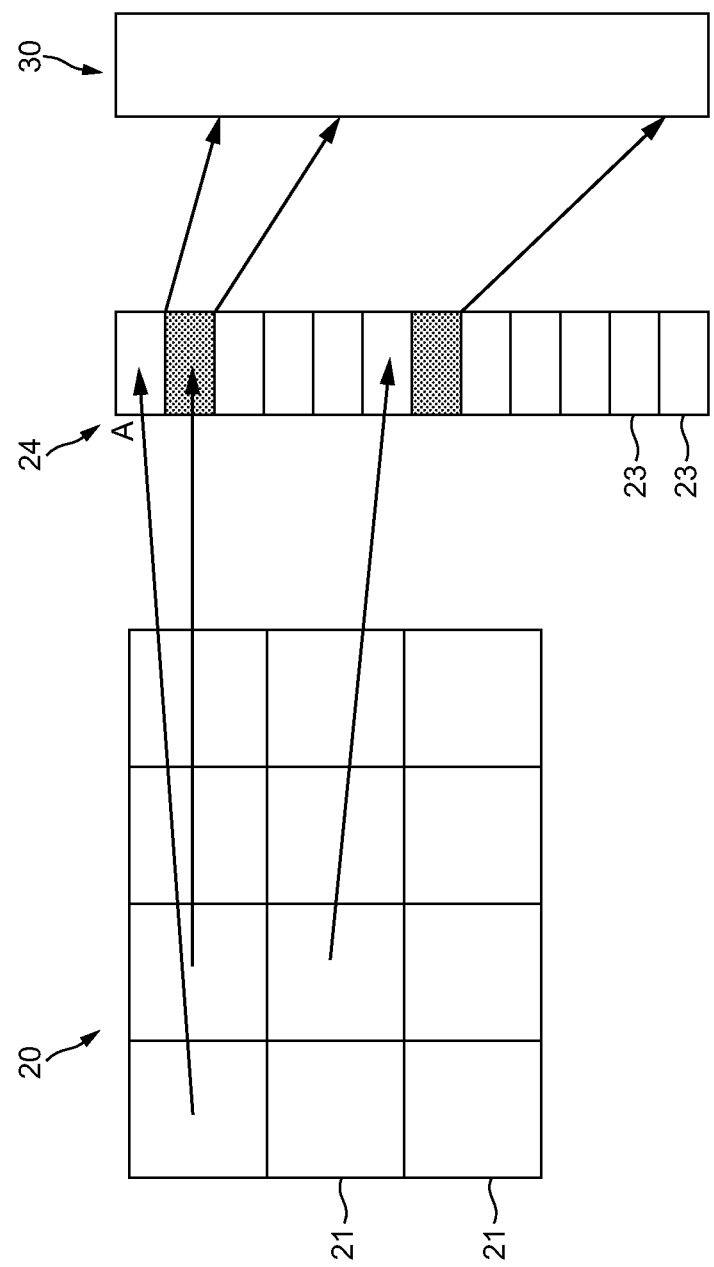
FIG. 3 shows schematically the storing of an array of data in accordance with further embodiments of the technology described herein.

FIG. 3 shows schematically the way that an array of original data 20 is stored in other embodiments of the technology described herein.

The storage arrangement in these embodiments and illustrated in FIG. 3 is similar in many respects to the arrangement described above with reference to FIGS. 1 and 2. The following description will therefore focus on the differences between the two arrangements.

As in the embodiment described above, in these embodiments, as shown in FIG. 3, a data array 20 to be stored is divided into a plurality of non-overlapping, equal-size and uniform blocks 21, each block corresponding to a particular region of the data array 20. Again, in these embodiments, each block 21 of the data array corresponds to a block of 16×16 elements (positions) within the data array 20 (i.e. a block of 16×16 texels in the case of a texture map).

Each block 21 that the data array 20 is divided into is then further sub-divided into uniform and equal-size sub-blocks 22 (not shown), each corresponding to a 4×4 data element region within the block 21 (e.g. 4×4 texels in the case of a texture map).

Similarly, to store the data array 20 in memory, a header data block 23 is stored in a header buffer 24 for each block 21 that the data array 20 has been divided into. Again, the header buffer 24 starts at a start address A in memory, and the header data blocks 23 are each stored at a predictable memory address within the header buffer 24.

In these embodiments of the present invention each header data block is configured to occupy only 16 bytes (and, as will be discussed further below, to contain only pointer data to the relevant sub-blocks' data). This again means that the header data blocks 23 are of a size that can be fetched using a system-friendly burst size.

The position that each header data block 23 is stored at within the header buffer 24 is again determined from (predicted from) the position within the data array of the block 21 that the header data block 23 relates to. In these embodiments, the address of the header data block 21 in the header buffer 24 for a data array element (e.g. texel or pixel) at a position x, y within the data array 20 is given by:

$$\text{header data block address} = A + 16*(x/16 + (y*xsize)/16)$$

where A is the start address of the header buffer, xsize and ysize are the vertical and horizontal dimensions, respectively, of the data array 20, the data array 20 is divided into 16×16 blocks, each header data block occupies 16 bytes, the divisions are done as integer divisions (rounding down), and the array width (xsize) is an exact multiple of the block size. (Again, if necessary padding data can be added to the input data array to ensure that it has a width (and height) evenly divisable by the block size (16) (such padding data can then be appropriately cropped by the decoder when decoding the data array if required).)

As well as storing a respective header data block 23 in the header buffer 24 for each block 21 that the original data array 20 is divided into, the data storage arrangements of the present embodiments also store data for each sub-block 22 that a given data block is divided into in a body buffer 30. However, in these embodiments, as shown in FIG. 3, the sub-blocks' data is simply stored in a continuous fashion in the body buffer 30 (i.e. the body buffer 30 is not divided into separate aligned "body blocks").

The body buffer 30 is stored after the header buffer 24. This allows the pointer data in the header data blocks to be in the form of offsets from the start or end of the header buffer 24. (Again, this is not essential, and the body buffer 30 may reside anywhere in memory, if desired.)

The header buffer 24 and body buffer 30 may again be stored in any suitable memory of the data processing system in question. Thus, for example, they may be stored in an on-chip memory or in an external memory, such as a main memory of the data processing system. They are in an embodiment stored in the same physical memory, but that is not essential.

Some or all of the header buffer and body buffer could also be copied to a local memory (e.g. cached), in use, if desired.

The data that is stored for the sub-blocks in the body buffer 30 again can comprise the data in the data array 20 in an uncompressed or in a compressed (encoded) form. In an embodiment, the sub-block data is encoded to give an encoded representation of the original data that has a reduced size as compared to the data in its original, unencoded form. Any suitable and desired encoding (compression) process can be used for this encoding.

Each header data block 23 in this embodiment again contains pointer data indicating the position within the body buffer 30 where the data for the sub-blocks for the block 21 that that header data block 23 relates to is stored.

In these embodiments, the pointer data in the header data blocks 23 indicates the start position in the body buffer 30 of the stored data for the respective sub-blocks that the header data block relates to, in the form of an offset from the start location A of the header buffer 24, together with a "size" indication value (in bytes) for each sub-block that the block that the header data block relates to has been divided into (encoded as). The size indication for a sub-block indicates the amount of memory (in bytes) that has been used to represent (signal) the data for the sub-block in the body buffer 30.

(Thus, as before, to locate the data for an individual sub-block in the body buffer 30, the decoder will use the pointer in the header data block 23 to determine the start position in the body buffer 30 of the data for the set of sub-blocks that the header data block 23 relates to, and then use the size information in the header data block 23 to sum the sizes of the stored data for the sub-blocks that are stored prior to the sub-block of interest, to determine the start position for the data in the body buffer 30 for the sub-block of interest. The end position of the data for the sub-block of interest is correspondingly determined using the indicated stored data size for the sub-block in question.)

In these embodiments, the header data blocks 23 are configured to contain only (to store only) the indication of the start position of the body buffer 30 of the stored data for the respective sub-blocks that the header data block relates to and the respective size indication values for each sub-block that the header data block relates to. Thus, unlike in the previous embodiment, the header data blocks do not store any "payload" sub-block data (i.e. any data that is to be used when decoding a given sub-block). This has the advantage that only the sub-block data and not any data that is in the header data block needs to be decoded when decoding a given sub-block.

When encoding with multiple different encoders, the encoding processes in these embodiments are configured to make sure that each encoder before it starts encoding has access to a continuous set of memory space that is the size of an uncompressed block of the data array 20. This is achieved by dividing the body buffer 30 into as many different parts as there are encoders available, and allocating each encoder one of the respective parts of the body buffer 30. Then when one encoder has filled its own buffer part to the point where there is not enough memory space available to guarantee that an encoded block of the data array will fit in the allocated space, the encoder is configured to take half of the space allocated for another encoder (rounded to the size of the uncompressed body buffer) and to then carry on its compression. As long as the granularity of the allocated body buffer parts is as big as the maximum size that an encoded block of the data array can occupy, this should not require any extra data.

In these embodiments, certain sub-block size indication values that can be indicated by the size fields in the header data blocks 23 are predefined as (set aside for) indicating special cases of sub-block, so as to facilitate signalling such special cases to the decoder in an efficient manner. In the present embodiments, the size indication values that are used for this purpose are for sizes which will not in fact occur in use, namely size indications of 0 or 1.

A size indication value of 1 is used to indicate that the data for the sub-block to which the size indication value relates has been stored in an uncompressed form in the body buffer.

A size indication value of 0 is used to indicate that the same data as was used for the preceding sub-block should be used when decoding the sub-block to which the size indication value of 0 relates (i.e. the same data as was used for sub-block n−1 should be used when decoding the sub-block n to which the size indication value of 0 relates). This effectively can be used to indicate the situation where a given sub-block can be considered to be a copy of (and thus can be copied from when decoding) another sub-block.

Where such a copy sub-block is identified in the encoding process, then no data for the copy sub-block is stored in the body buffer 30. This can allow the sub-block data to be stored in a more compressed form in the body buffer 30, by avoiding the storage of duplicated sub-block data. For example, for a constant colour block, a set of sub-block data for the first sub-block of the block can be stored, but then all the remaining blocks can simply be allocated a size indication of 0 in the header data block, with no data being stored for those sub-blocks in the body buffer 30.

To further enhance the potential benefit of the use of a "copy" sub-block size value indication, in these embodiments the sub-blocks for a given block of the data array are encoded and stored in an order that follows a space filling curve, such as a Peano curve, U-order, Z-order, etc., so as to ensure that each sub-block is always encoded (stored) next to a spatially near neighbour sub-block. This can also help to enhance the benefits of caching of any sub-block data.

In the present embodiments, as discussed above, 16-byte header blocks which contain a pointer to the start of the sub-block data in the body buffer 30 together with a size indication value for each sub-block, are used. The basic layout of each header data block is for the pointer to the start of the set of sub-blocks' data for the block in question to come first, followed by size indication values for each respective sub-block (in the order that the sub-blocks are encoded and stored in the body buffer 30). The actual sizes of the pointer and size indication values and the layout of the sub-blocks in the body buffer 30 are, however, configured differently, depending upon the form of the data that is being encoded. In particular, different storage arrangements are used for RGB and YUV data. This will be discussed and illustrated below, with reference to FIGS. 4-13.

Figure 4:
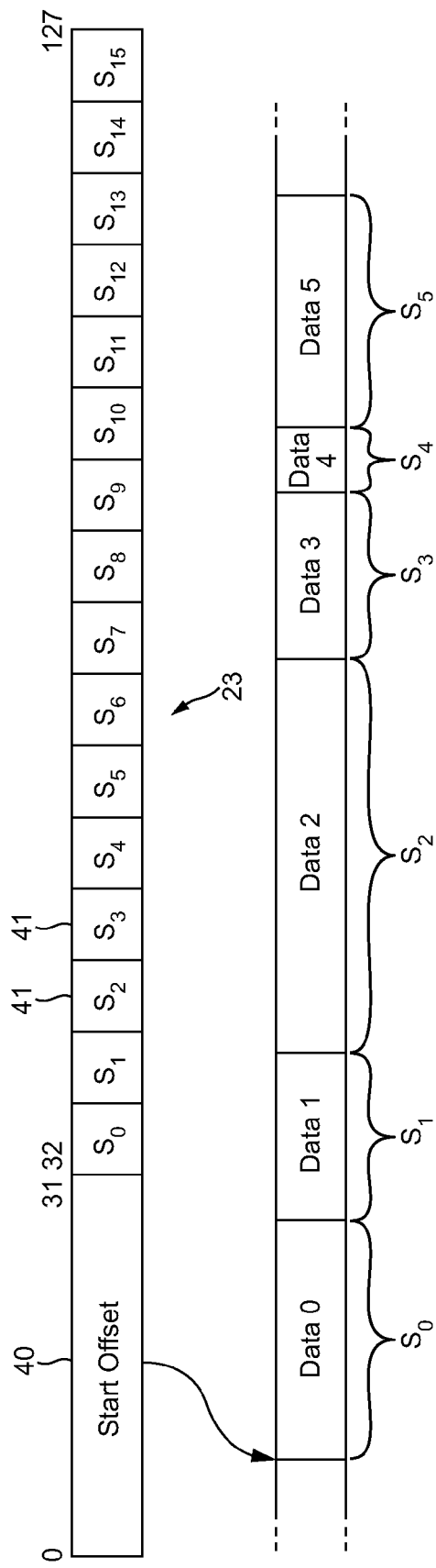
FIGS. 4 and 6 show schematically the arrangement for a block of a data array of data in a header data block and a body buffer in memory in a second embodiment of the technology described herein.
Figure 5:
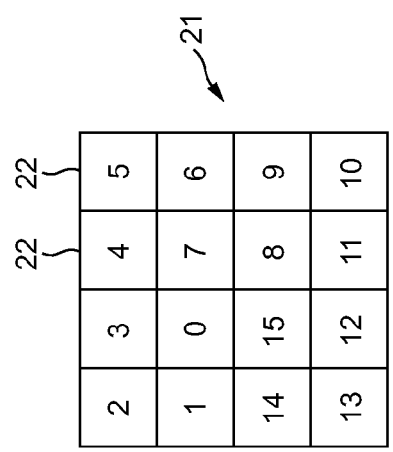
FIG. 5 shows schematically the order of the stored sub-block data in the embodiment of FIG. 4.
Figure 6:
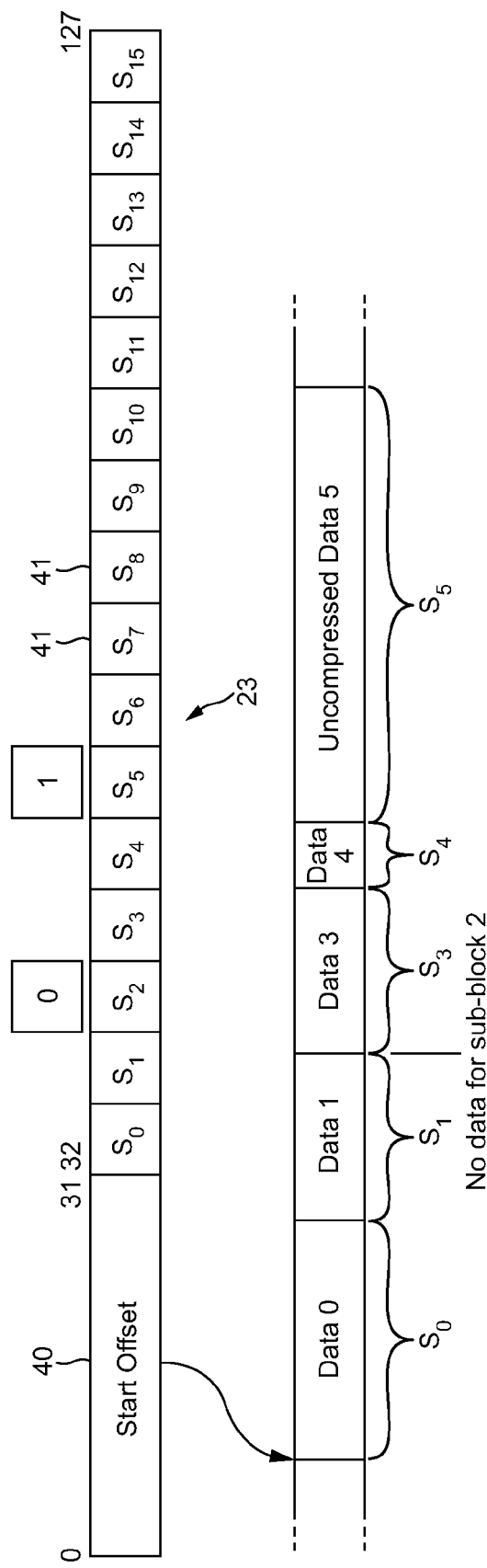
Figure 7:
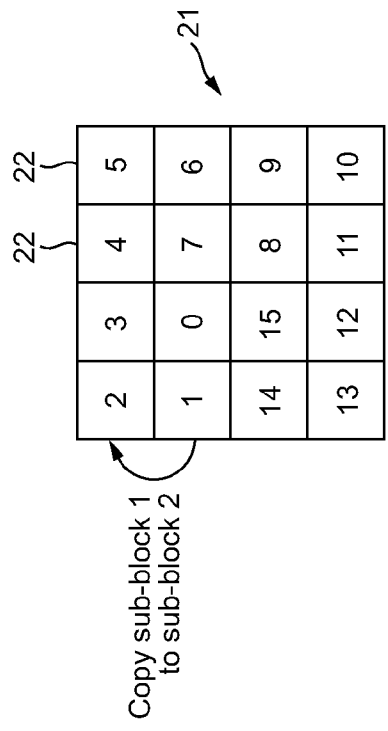
FIG. 7 shows schematically the order of the stored sub-block data in the embodiment of FIG. 6.

FIGS. 4-7 show the arrangement of a header data block and the sub-blocks' data for a respective block of the data array 20 when encoding and storing RGB or RGBA data. FIGS. 4 and 5 show the arrangement for a block of a data array that does not contain any predefined "special case" sub-blocks, and FIGS. 6 and 7 show the arrangement for a block of the data array that does include some predefined special case sub-blocks (namely a "copy" sub-block and an uncompressed sub-block).

In this case, where each block that the data array is divided into represents 16×16 data entries, then for RGB or RGBA data each block of the data array is divided into and encoded as 16 4×4 sub-blocks. Each sub-block will accordingly be stored as a three or four component texture.

As shown in FIGS. 4 and 5, the header data block 23 includes a 32 bit pointer 40 in the form of an offset to the start of the sub-block data for the data block in the body buffer 30, and then 16 6-bit size indication values 41, one for each sub-block that the block of the data array has been divided into for encoding purposes (as discussed above), thereby providing in total a 16-byte header data block. As shown in FIGS. 4 and 5, each size indication value in the header data block 23 indicates the memory size that has been used to store the data to be used to decode the respective sub-block in the body buffer 30 that the size indication value relates to.

FIG. 5 shows the order that the 16 4×4 sub-blocks of the block of each data array are encoded and stored in. As can be seen from FIG. 5, the encoding order follows a space filling curve, in this case a Peano curve.

FIGS. 6 and 7 show the data storage arrangement for RGB or RGBA data for a block where it has been determined that the third sub-block (sub-block number 2) can be considered to be a copy of the second sub-block (sub-block number 1). In this case, the size indication value S2 for the third sub-block is set to the value "0" which has been predefined as indicating a copy sub-block, and as shown in FIGS. 6 and 7, no sub-block data is stored for the third sub-block (sub-block number 2) in the body buffer 30, but rather the data stored for the second sub-block (sub-block number 1) will be reused by the decoder to decode the third sub-block (sub-block number 2).

FIG. 6 also shows an exemplary uncompressed sub-block (sub-block 5), which accordingly has its size indication value S5 set to the value 1 that has been predefined as indicating an uncompressed sub-block.

These arrangements will be used for other formats of data where it is desired to store all the data components together in the same sub-block.

Figure 8:
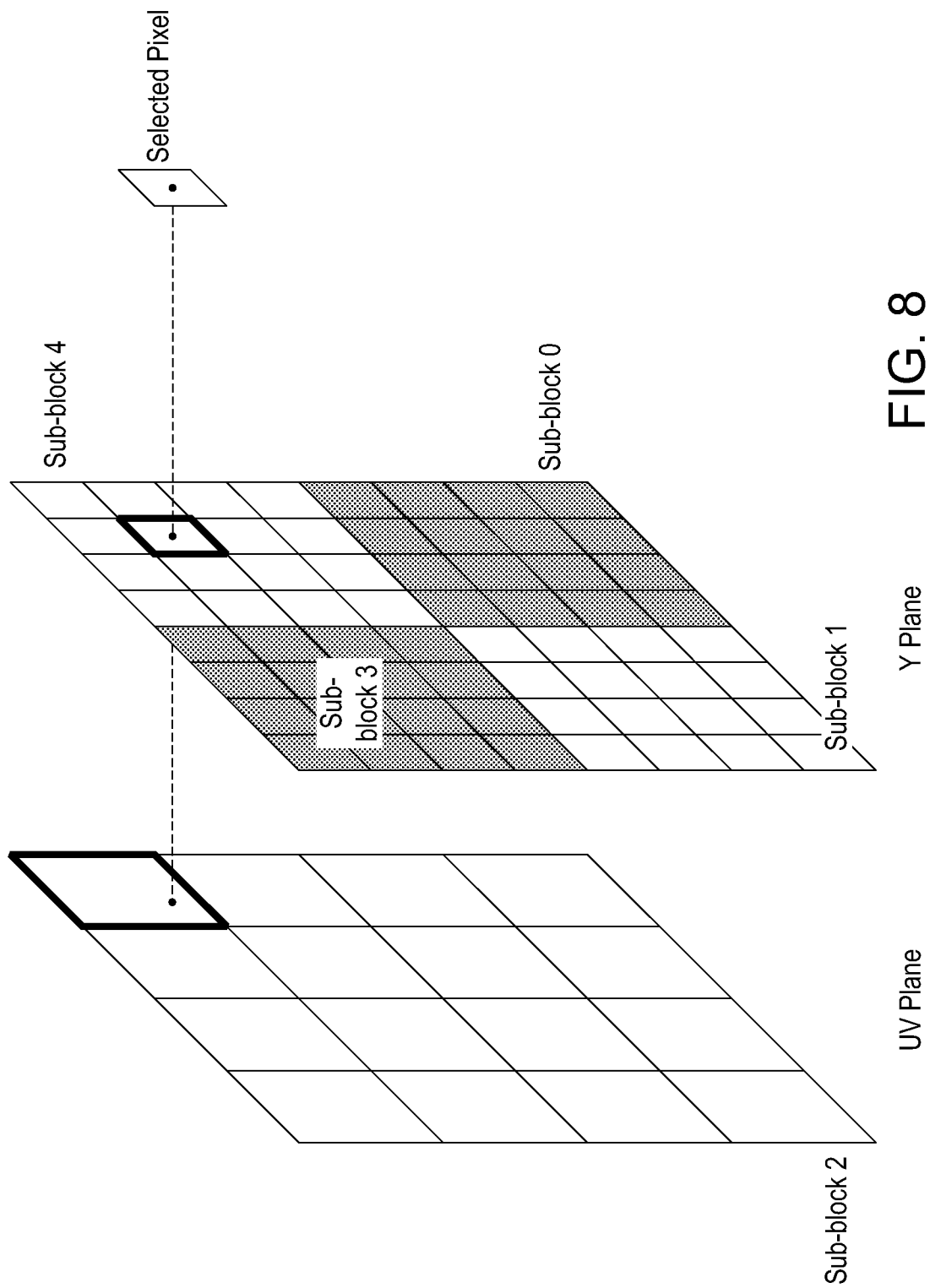
FIG. 8 shows schematically an encoding arrangement for YUV 420 data in an embodiment of the technology described herein.
Figures 9, 10:
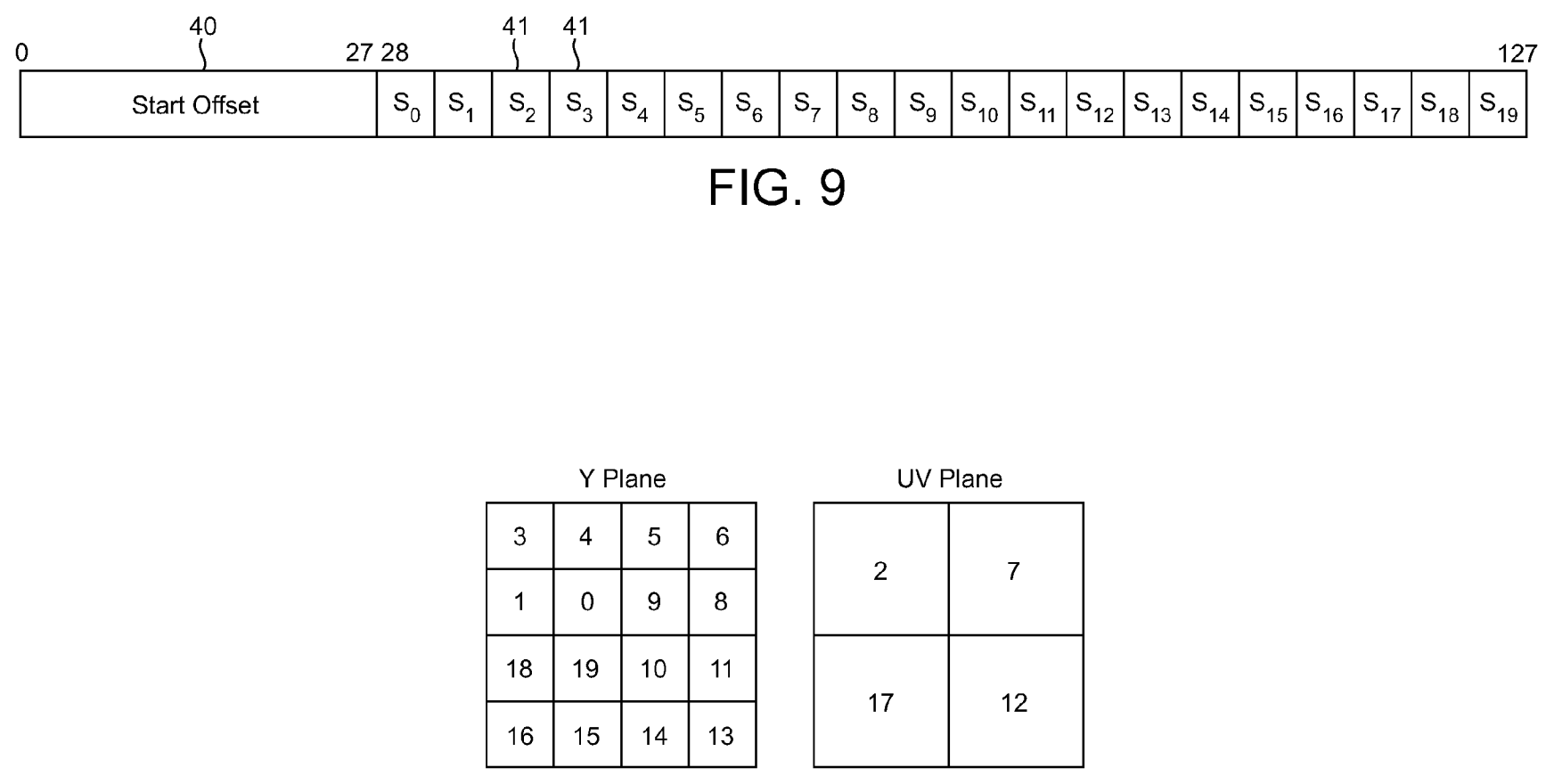
Figure 11:
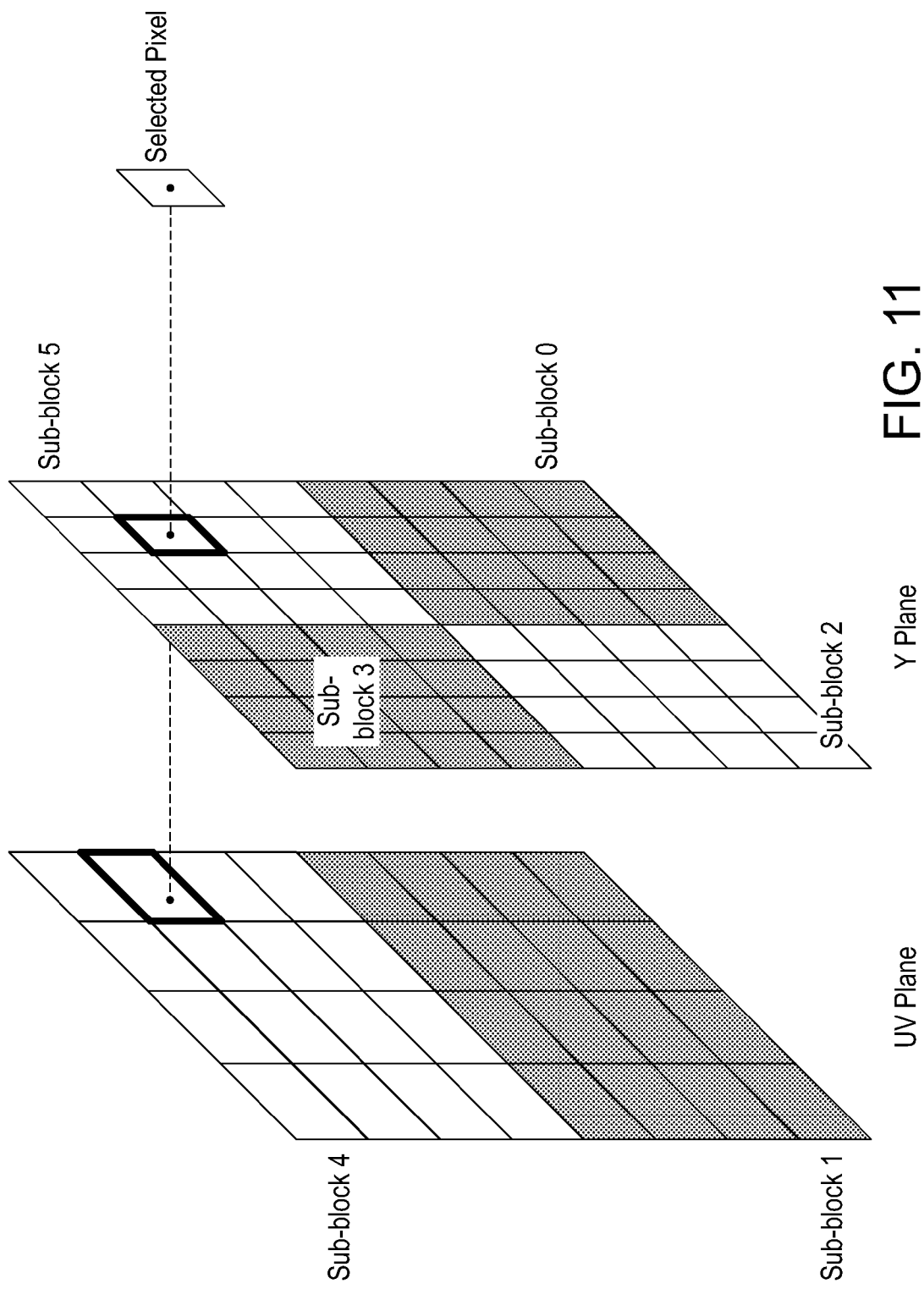
FIG. 11 shows schematically an encoding arrangement for YUV 422 data in an embodiment of the technology described herein.

FIGS. 8-13 illustrate the storage arrangement that is used in the present embodiments for YUV data. FIGS. 8-10 show the arrangement for YUV 420 data and FIGS. 11-13 show the arrangement for YUV 422 data. As can be seen from these Figures, in these arrangements the Y-plane data and the UV-plane data is stored in separate sub-blocks. This facilitates reading and decoding that data separately, and also can be used to allow for the fact that the two different types of data are stored at different resolutions.

FIG. 8 shows the principle of the storage arrangement for YUV 420 format data. In this format, four Y samples are used for every set of UV values. Thus, as illustrated in FIG. 8, the Y-plane values are encoded and stored at a higher resolution than the UV-plane values. The effect of this then is that one 4×4 block of UV (chrominance) values will be required for each set of four 4×4 sub-blocks of Y (luminance) values.

As shown in FIGS. 9 and 10, to account for this, for each 16×16 block of YUV data, the Y-plane and the UV-plane are encoded and stored separately, with 16 4×4 sub-blocks being used and stored for the Y-plane, and 4 4×4 sub-blocks being used and stored for the UV-plane data. Thus, for each block that the data array has been divided into, twenty sub-blocks will be stored, sixteen representing the Y (luminance) data and four representing the UV (chrominance) data. The Y (luminance) data sub-blocks will be stored as one component textures, and the UV (chrominance) data sub-blocks will be stored as 2-component textures.

Each header data block will accordingly, as shown in FIG. 9, contain 20 sub-block size indication values 41. To allow each header data block still to occupy 16-bytes, in these arrangements the offset data 40 to the start of the sub-blocks' data is configured to occupy 28 bits, and each sub-block size indication value 41 occupies 5 bits.

Again, the sub-blocks are encoded and stored in an order that essentially follows a space-filling curve, but as shown in FIG. 10, the arrangement is such that the UV data sub-blocks are interleaved in the order of the sub-blocks with the Y data sub-blocks, such that the corresponding UV data sub-blocks are stored locally to the Y data sub-blocks that they are to be used with when decoding the data.

FIGS. 11-13 show the corresponding arrangement for YUV 422 data. In this case, as is known in the art, two Y samples will share a set of UV samples (as shown in FIG. 11). Thus in this case, as shown in FIG. 13, the Y data will again be encoded as 16 4×4 sub-blocks, but there will be 8 4×4 UV sub-blocks. The effect of this then is that twenty-four sub-blocks will be stored for each block that the data array has been divided into, sixteen Y sub-blocks and eight UV data sub-blocks.

In this case, as shown in FIG. 12, each header data block is configured to have a 32-bit offset pointer 40, and then 24 4-bit sub-block size indication values 41. As shown in FIG. 13, the order that the sub-blocks are encoded and stored in again essentially follows a space filling curve, but is configured to appropriately interleave the UV data sub-blocks with their corresponding Y data sub-blocks.

In these arrangements where, for example, a copy sub-block is indicated, then a "copy" chrominance sub-block should be copied from the previous chrominance sub-block, and a "copy" luminance sub-block should be copied from the previous luminance sub-block, by the decoder.

These arrangements for storing YUV data can correspondingly be used for other forms of data where it is desired to store different components of the data separately, in different sub-blocks.

In operation to encode a data array 20 in the manner of the above embodiments, suitably configured and/or programmed processing circuitry will receive and/or fetch from memory a stream of data representing the original data array 20, and operate to divide the data array 20 into blocks and sub-blocks as discussed above, generate and store appropriate header data blocks, and generate encoded data for the sub-blocks of the data array and store the encoded data for the sub-blocks of the data array in memory. If necessary, padding data can be added to the input data array to ensure that it has a width and height evenly dividable by 16 (such padding data can then be appropriately cropped by the decoder when decoding the data array if required).

The above primarily describes the way in the present embodiments that the data array is processed and stored in memory for use. When the so-stored data array comes to be used, for example to apply to fragments to be rendered (where the stored data array is a texture map for use in graphics processing), then the reading and decoding process for the stored data array will essentially comprise the reverse of the above storing and encoding process.

Thus, the decoding device, such as a graphics processor (e.g. where the stored data array is texture map) or a display controller (e.g., where the stored data array is a frame to be displayed), will first identify the position(s) of the particular element or elements in the data array that are of interest (i.e., whose values are to be determined). It will then determine the start address A of the header buffer for the data array (if necessary, this can be communicated to the decoder by the, e.g., software that controls the encoder and decoder setting a control register with a pointer to the header buffer), and then use that start address together with the position of the data array element or elements that are of interest to determine the location of the header data block for the block of the data array that the data element(s) falls within in the manners discussed above.

The decoder will then read the header data block from the identified memory location and determine therefrom the pointer data and sub-block size data indicating the memory location of the relevant sub-block data of the block of the data array that should be used to reproduce the data element or elements in question. The decoder will then, e.g. read, and use the relevant sub-block data from the determined memory location, and decode that data, using if necessary any other encoded data that is stored in the header data block (as discussed above), to determine the value of the data element or elements of interest.

This decoding process should also take account of any predefined "special case" sub-block size indication values, as discussed above. Thus, if the decoder identifies in the header data block a sub-block size value indicating a "copy" sub-block, the decoder should accordingly use the sub-block data that was (or that would be) used for the preceding block to determine the value of the data element or elements in question.

In the case of decoding YUV data where the luminance and chrominance values are stored as separate sub-blocks, for example, the decoding process should accordingly, where required, identify both the relevant luminance sub-block data and the relevant chrominance sub-block data and decode both sets of sub-block data to determine the luminance and chrominance values needed for the data element or elements in question.

This process can then be repeated for each data element of interest (whose value is required).

Figure 14:
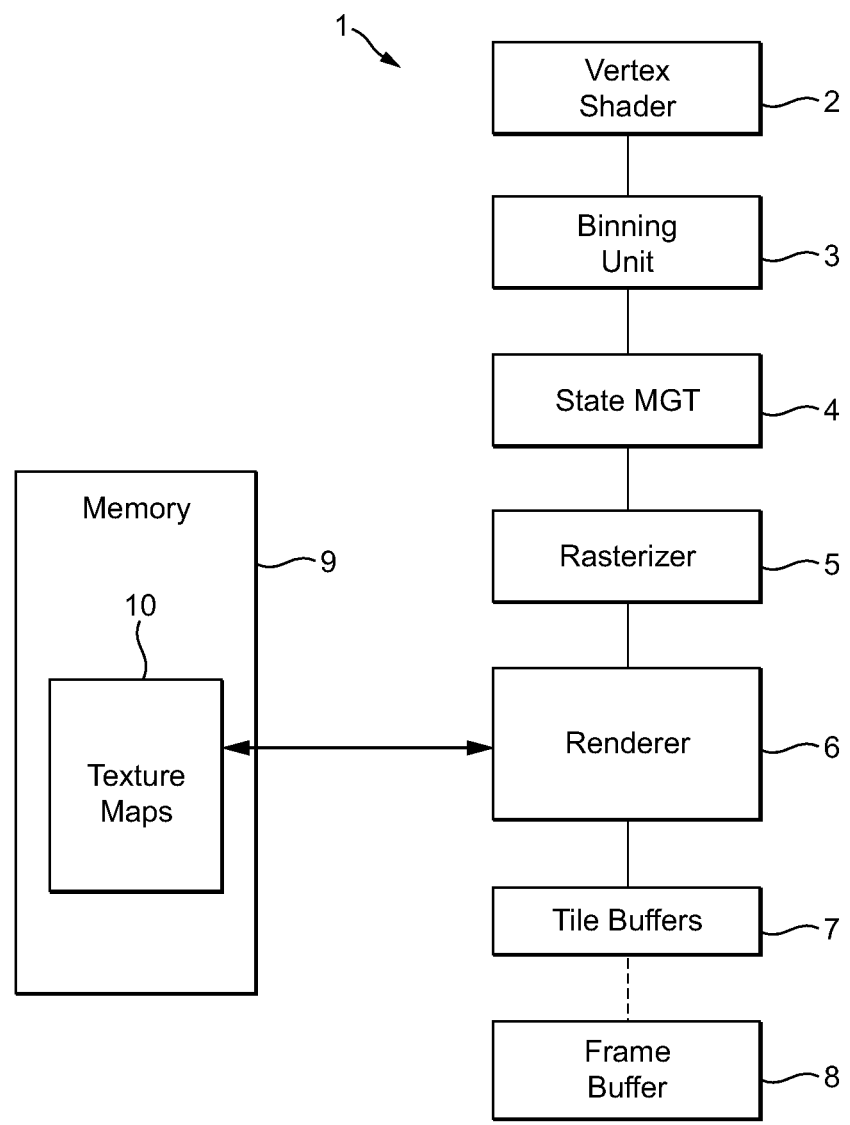
FIG. 14 shows schematically a graphics processing system that may use data arrays stored in accordance with the technology described herein.

FIG. 14 shows schematically an arrangement of a graphics processing system 1 that can store and use data arrays that have been stored in the manner of the present embodiment.

FIG. 14 shows a tile-based graphics processing system. However, as will be appreciated, and as discussed above, the technology described herein can be implemented in other arrangements of graphics processing system as well (and, indeed, in other data processing systems).

The system includes, as shown in FIG. 14, a tile-based graphics processor (GPU) 1. This graphics processor 1 generates output data arrays, such as output frames intended for display on a display device, such as a screen or printer, in response to instructions to render graphics objects, etc. that it receives.

As shown in FIG. 14, the graphics processor 1 includes a vertex shader 2, a binning unit 3, a state management unit 4, a rasterising stage 5, and a rendering stage 6 in the form of a rendering pipeline.

The vertex shader 2 receives descriptions of graphics objects to be drawn, vertices, etc., e.g. from a driver (not shown) for the graphics processor 1, and performs appropriate vertex shading operations on those objects and vertices, etc., so as to, for example, perform appropriate transform and lighting operations on the objects and vertices.

The binning unit 3 sorts (bins) the various primitives, objects, etc., required for an output to be generated by the graphics processor 1 (such as a frame to be displayed) into the appropriate bins (tile lists) for the tiles that the output to be generated is divided into (since, as discussed above, this exemplary graphics processing system is a tile-based graphics processing system).

The state management unit 4 stores and controls state data and the state of the graphics processing units to control the graphics processing operation.

The rasteriser 5 takes as its input primitives to be displayed, and rasterises those primitives to sampling positions and fragments to be rendered.

The rendering pipeline 6 takes fragments from the rasteriser 5 and renders those fragments to generate the output data (the data for the output (e.g. frame to be displayed) of the graphics processor 1).

As is known in the art, the rendering pipeline will include a number of different processing units, such as fragment shaders, blenders, texture mappers, etc.

In particular, as shown in FIG. 14, the rendering unit 6 will, inter alia, access texture maps 10 stored in a memory 9 that is accessible to the graphics processor 1, so as to be able to apply the relevant textures to fragments that it is rendering (as is known in the art). The memory 9 where the texture maps 10 are stored may be an on-chip buffer or external memory (e.g. main system memory) that is accessible to the graphics processor 1.

The graphics processor 1 generates its output data arrays, such as output frames, by generating tiles representing different regions of a respective output data array (as it is a tile-based graphics processor). Thus, the output from the rendering pipeline 6 (the rendered fragments) is output to tile buffers 7.

The tile buffers' outputs are then written to a frame buffer 8, e.g. for display. The frame buffer 8 may reside, e.g. in main memory (which memory may be DDR-SDRAM) of the system (not shown). The data from the tile buffers may be downsampled before it is written to the frame buffer, if desired.

The texture maps 10 and the frame buffer 8 may be stored in the same physical memory, or they may be stored in different memories, as desired.

Sometime later, the data array in the frame buffer 3 will be read by a display controller and output to a display device for display (not shown).

The graphics processing system shown in FIG. 14 uses the data array storing and decoding arrangements of the embodiments described above in respect of both the stored texture maps 10 in the memory 9, and when storing its output data in the frame buffer 8.

Thus, each texture map 10 that is stored in the memory 9 for use by the rendering unit 6 is stored in the form of one of the embodiments described above. Accordingly, when the rendering unit 6 needs to access a texture map, it will read and decode the texture map data in the manners described above.

Similarly, when the generated output data from the graphics processor 1 is written to the frame buffer 8 from the tile buffer 7, that data is processed in one of the manners described above, to take the data from the tile buffers 7 and store it in one of the formats described above in the frame buffer 8. This data can then be read and decoded from the frame buffer 8 in the manners described above by, e.g., the display controller of the display on which the frame is to be displayed.

It will be appreciated that each of the stages, elements, and units, etc., of the graphics processor as shown in FIG. 14 may be implemented as desired and will accordingly comprise, e.g., appropriate processing circuitry, such as processing logic, programmable processing logic, etc., for performing the necessary operations and functions, and will provide the appropriate control and processing circuitry, etc., for performing the technology described herein.

It will also be appreciated here that FIG. 14 simply shows the arrangements schematically, and thus, for example, the data flow in operation of the technology described herein need not and may not be as shown in FIG. 14, but may, for example, involve the looping back of data as between the various units and stages shown in FIG. 14 as appropriate.

Although, the present embodiment has been described above as dividing the data array into 16×16 blocks of data elements, other arrangements could be used. For example, the data array could be divided into 8×8 or 16×4 blocks, if desired.

Also, although the present embodiments have been described above with particular reference to the use of the techniques of the present embodiment with graphics processors and display controllers, the techniques of the technology described herein can be used for other data array and in particular image processing arrangements. For example, they may be used in image signal processors and video decoders and encoders (MPEG/h.264, etc.). In these cases, for example, the techniques of the technology described herein could be used to store an image generated by an image signal processor which is processing data received from an image sensor to make a watchable image out of it. A video encoder/decoder, for example, could load an image (e.g. video frame) stored in the form of the technology described herein to then compress the image using some other standard like h.264, and correspondingly store frames of video data using the techniques of the technology described herein, for example for provision to a graphics processor or a display controller.

As can be seen from the above, the technology described herein, in some embodiments at least, provides a method and apparatus for storing data arrays that can allow the stored data to take less memory space (to be stored more efficiently), reduce the amount of memory traffic for reading the stored data, and/or make more efficient the memory traffic for reading the stored data. It can accordingly, thereby reduce power consumption.

The technology described herein in some embodiments at least can also provide a way to link variable-sized compressed data in memory to allow random access while at the same time granting energy-efficient access patterns and allowing for multiple encoders to encode the data stream in parallel. When used for compressed texture data it allows variable-size compressed data to be fetched without decompressing the whole stream. When used as a frame buffer format it allows simple rotation and cropping. This all reduces bandwidth and power on a system level.

This is achieved, in some embodiments at least, by dividing a data array to be stored into plural blocks, further dividing each respective block of the data array into a set of sub-blocks, and storing data representing the sub-blocks together with a header data block for each set of sub-blocks (i.e. for each block that the data array is divided into), which header includes pointer data indicating where the respective sub-block data can be found. In some embodiments, the header data blocks also contain further data to be used when determining the data values for data elements of the stored data array, and are in an embodiment configured to be of a burst-friendly size for the data processing system in question.

The data storage arrangement of the technology described herein is particularly suited to use for textures and frame buffers, and can decrease external bandwidth as well as facilitating random access to the stored data and being decodable at line speed for the texture cache. The arrangement of the technology described herein, in some embodiments at least, allows the efficient fetching of the data for a given sub-block within the overall data array, and with little overhead.

The technology described herein can also provide predictable memory read patterns for a display controller (when used as a frame buffer format) whilst still retaining random access possibilities for use for textures (for a texture mapper) for example. Using the same data storage format structure both for the frame buffer and for textures provides a more simplified system.

The foregoing detailed description has been presented for the purposes of illustration and description. It is not intended to be exhaustive or to limit the invention to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of storing an array of data in memory, the method comprising:
   dividing the array of data to be stored into a plurality of blocks;
   dividing each respective block of the data array into a plurality of sub-blocks;
   storing data representing each respective sub-block of the data array in memory;
   storing, for each respective block that the data array has been divided into, a header data block at a predictable memory address, the header data block containing pointer data indicating the location in memory where the data for the sub-blocks for the block of the data array that the header data block relates to is stored;
   storing in each header data block pointer data indicating a base memory location for the data for the set of sub-blocks that the header data block corresponds to, and a size indication value for each sub-block of the set of sub-blocks that the header data block corresponds to; and
   at least one of the size indication values for a sub-block that can be included in a header data block is predefined as indicating that the data stored for another sub-block should be used for the sub-block to which the size indication value relates.

2. The method of claim 1, further comprising:
   storing all the header data blocks for a data array together in a header buffer for the data array.

3. The method of claim 1, further comprising:
   storing each header data block at a memory address that can be predicted from the position within the data array of the block of the data array that the header data block relates to.

4. The method of claim 1, further comprising:
   storing in each header data block only the pointer data indicating a base memory location for the data for the set of sub-blocks that the header data block corresponds to, and a size indication value for each sub-block of the set of sub-blocks that the header data block corresponds to, and storing all the data that is to be decoded to reproduce the stored data array as respective sub-block data, such that only the stored data for a sub-block is needed to decode the sub-block to determine the data values of the data elements of the sub-block.

5. The method of claim 1, wherein:
   the data array comprises plural different data components, and the step of dividing each respective block of the data array into a plurality of sub-blocks comprises dividing each block of the data array into plural sets of sub-blocks, each set of sub-blocks relating to different data components of the data array.

6. A method of determining the value of a data element of a stored data array in a data processing system, the method comprising:
   determining the memory location of a stored header data block for a block of the data array that the data element falls within;
   reading the header data block and determining therefrom pointer data indicating the memory location of data representing a sub-block of the block of the data array that the data element falls within;
   using the sub-block data from the determined memory location to determine the value of the data element; and
   if the pointer data in the header data block indicating the memory location of data representing a sub-block of the block of the data array that the data element falls within has a particular value, using sub-block data that is to be used for another sub-block of the block of the data array that the data element falls within to determine the value of the data element.

7. The method of claim 6, wherein:
the memory location of the header data block is determined from the position of the data element within the data array.

8. An apparatus for storing an array of data in memory, comprising:
processing circuitry that divides the array of data to be stored into a plurality of blocks, divides each respective block of the data array into a plurality of sub-blocks, stores data representing each respective sub-block of the data array in memory, and stores, for each respective block that the data array has been divided into, a header data block at a predictable memory address, the header data block containing pointer data indicating the location in memory where the data for the sub-blocks for the block of the data array that the header data block relates to is stored;
the processing circuitry stores in each header data block pointer data indicating a base memory location for the data for the set of sub-blocks that the header data block corresponds to, and a size indication value for each sub-block of the set of sub-blocks that the header data block corresponds to; and
at least one of the size indication values for a sub-block that can be included in a header data block is predefined as indicating that the data stored for another sub-block should be used for the sub-block to which the size indication value relates.

9. The apparatus of claim 8, wherein:
the processing circuitry stores all the header data blocks for a data array together in a header buffer for the data array.

10. The apparatus of claim 8, wherein:
the processing circuitry stores each header data block at a memory address that can be predicted from the position within the data array of the block of the data array that the header data block relates to.

11. The apparatus of claim 8, wherein:
the processing circuitry stores in each header data block only the pointer data indicating a base memory location for the data for the set of sub-blocks that the header data block corresponds to, and a size indication value for each sub-block of the set of sub-blocks that the header data block corresponds to, and stores all the data that is to be decoded to reproduce the stored data array as respective sub-block data, such that only the stored data for a sub-block is needed to decode the sub-block to determine the data values of the data elements of the sub-block.

12. The apparatus of claim 8, wherein:
the data array comprises plural different data components, and the processing circuitry divides each block of the data array into plural sets of sub-blocks, each set of sub-blocks relating to different data components of the data array.

13. An apparatus for determining the value of a data element of a stored data array in a data processing system, comprising:
processing circuitry that determines the memory location of a header data block for a block of the data array that the data element falls within, reads the header data block and determines therefrom pointer data indicating the memory location of data representing a sub-block of the block of the data array that the data element falls within, and uses the sub-block data from the determined memory location to determine the value of the data element; and
the processing circuitry, if the pointer data in the header data block indicating the memory location of data representing a sub-block of the block of the data array that the data element falls within has a particular value, uses the sub-block data that is to be used for another sub-block of the block of the data array that the data element falls within to determine the value of the data element.

14. The apparatus of claim 13, wherein:
the memory location of the header data block is determined from the position of the data element within the data array.

15. A non-transitory computer readable storage medium storing computer software code which when executing on a processor performs a method of storing an array of data in memory, the method comprising:
dividing the array of data to be stored into a plurality of blocks;
dividing each respective block of the data array into a plurality of sub-blocks;
storing data representing each respective sub-block of the data array in memory;
storing, for each respective block that the data array has been divided into, a header data block at a predictable memory address, the header data block containing pointer data indicating the location in memory where the data for the sub-blocks for the block of the data array that the header data block relates to is stored;
storing in each header data block pointer data indicating a base memory location for the data for the set of sub-blocks that the header data block corresponds to, and a size indication value for each sub-block of the set of sub-blocks that the header data block corresponds to; and
at least one of the size indication values for a sub-block that can be included in a header data block is predefined as indicating that the data stored for another sub-block should be used for the sub-block to which the size indication value relates.

16. A non-transitory computer readable storage medium storing computer software code which when executing on a processor performs a method of determining the value of a data element of a stored data array in a data processing system, the method comprising:
determining the memory location of a stored header data block for a block of the data array that the data element falls within;
reading the header data block and determining therefrom pointer data indicating the memory location of data representing a sub-block of the block of the data array that the data element falls within;
using the sub-block data from the determined memory location to determine the value of the data element; and
if the pointer data in the header data block indicating the memory location of data representing a sub-block of the block of the data array that the data element falls within has a particular value, using sub-block data that is to be used for another sub-block of the block of the data array that the data element falls within to determine the value of the data element.

* * * * *